United States Patent
Ali et al.

(10) Patent No.: US 11,386,095 B2
(45) Date of Patent: Jul. 12, 2022

(54) NATURAL LANGUAGE QUERYING OF DATA IN A STRUCTURED CONTEXT

(71) Applicant: SparkCognition, Inc., Austin, TX (US)

(72) Inventors: Syed Mohammad Ali, Austin, TX (US); Erik Skiles, Manor, TX (US)

(73) Assignee: SPARKCOGNITION, INC., Austin, TX (US)

( * ) Notice: Subject to any disclaimer, the term of this patent is extended or adjusted under 35 U.S.C. 154(b) by 148 days.

(21) Appl. No.: 16/912,966

(22) Filed: Jun. 26, 2020

(65) Prior Publication Data
US 2020/0327133 A1 Oct. 15, 2020

Related U.S. Application Data

(63) Continuation of application No. 15/705,050, filed on Sep. 14, 2017, now Pat. No. 10,698,905.

(51) Int. Cl.
*G06F 16/2457* (2019.01)
*G06F 16/242* (2019.01)
*G06F 16/248* (2019.01)

(52) U.S. Cl.
CPC ...... *G06F 16/24573* (2019.01); *G06F 16/243* (2019.01); *G06F 16/248* (2019.01)

(58) Field of Classification Search
CPC . G06F 16/24573; G06F 16/243; G06F 16/248
See application file for complete search history.

(56) References Cited

U.S. PATENT DOCUMENTS

| | | |
|---|---|---|
| 6,510,434 B1 | 1/2003 | Anderson et al. |
| 6,754,648 B1 | 6/2004 | Fittges et al. |
| 2005/0256889 A1 | 11/2005 | McConnell |
| 2012/0254143 A1* | 10/2012 | Varma ............. G06F 40/30 707/706 |
| 2016/0132787 A1* | 5/2016 | Drevo ............. G06N 20/10 706/12 |
| 2016/0306791 A1 | 10/2016 | Allen et al. |

OTHER PUBLICATIONS

Socher, R., et al., "Semantic Compositionality through Recursive Matrix-Vector Spaces," Proceedings of the 2012 Joint Conf. on Empirical Methods in Natural Language and Computational Natural Language Learning, Jeju Island, Korea, 2012, pp. 1201-12011.

* cited by examiner

*Primary Examiner* — Baoquoc N To
(74) *Attorney, Agent, or Firm* — Moore IP Law

(57) ABSTRACT

A particular method includes automatically generating, at a processor of a computing device, annotation data indicating that a column of a data table corresponds to a particular class of an ontology. The method also includes storing the annotation data. The method further includes receiving a natural language query. The method also includes generating a second query based on detecting a match between at least one term of the natural language query and the annotation data. The method further includes determining a response to the second query. The method also includes outputting the response to the second query as a response to the natural language query.

23 Claims, 13 Drawing Sheets

500

Data Table 140

| Row ID | First Name | Product | Quantity Purchased | Price per Unit | Total Price | Date of Purchase | StoreID |
|---|---|---|---|---|---|---|---|
| 0001 | Joe | Apple | 12 | $0.75 | $9.00 | 1/10/2016 | 0021 |
| 0002 | Mary | Orange | 18 | $0.5 | $9.00 | 1/25/2016 | 0026 |
| 0003 | Alex | Watermelon | 6 | $2 | $12.00 | 1/14/2016 | 0026 |
| 0004 | Joe | Mango | 24 | $0.6 | $14.40 | 2/1/2016 | 0021 |
| 0005 | Beth | Strawberry | 30 | $0.3 | $9.00 | 1/17/2016 | 0025 |
| 0006 | Joe | Grapes | 40 | $0.3 | $12.00 | 2/12/2016 | 0025 |
| 0007 | Mary | Apple | 12 | $0.75 | $9.00 | 1/11/2016 | 0026 |
| 0008 | Mary | Orange | 6 | $0.5 | $3.00 | 1/21/2016 | 0026 |
| 0009 | Alex | Orange | 8 | $0.75 | $6.00 | 1/16/2016 | 0026 |
| 0010 | Beth | Grapefruit | 10 | $0.75 | $7.50 | 1/5/2016 | 0025 |

Table Metadata 144

| Col. Name | Row ID | First Name | Product | Quantity Purchased | Price per Unit | Total Price | Date of Purchase | StoreID |
|---|---|---|---|---|---|---|---|---|
| Field Type | ID | TEXT | TEXT | INTEGER | CURRENCY | CURRENCY | DATE | REF |

Annotation Data 568 →

| How, Unit Price, Currency |
|---|
| Unit Price, Currency, Dollar |
| Unit Price, Currency, Dollar |
| Unit Price, Currency, Dollar |
| Unit Price, Currency, Dollar |
| Unit Price, Currency, Dollar |
| Unit Price, Currency, Dollar |
| Unit Price, Currency, Dollar |
| Unit Price, Currency, Dollar |
| Unit Price, Currency, Dollar |
| Unit Price, Currency, Dollar |

Annotation Data 570 →

| How, Total Price, Currency |
|---|
| Total Price, Currency, Dollar |
| Total Price, Currency, Dollar |
| Total Price, Currency, Dollar |
| Total Price, Currency, Dollar |
| Total Price, Currency, Dollar |
| Total Price, Currency, Dollar |
| Total Price, Currency, Dollar |
| Total Price, Currency, Dollar |
| Total Price, Currency, Dollar |
| Total Price, Currency, Dollar |

Annotation Data 566 →

| When, DateTime |
|---|
| Day of Year |
| Day of Year |
| Day of Year |
| Day of Year |
| Day of Year |
| Day of Year |
| Day of Year |

Annotation Data Generator 106
- Annotation Data 160
  - Annotation Data 260
  - Annotation Data 262
  - Annotation Data 264
  - Annotation Data 566
  - Annotation Data 568
  - Annotation Data 570
- Data Type Detector 112
  - Ontology Class Detector 110
  - Reference/ID Detector 204
  - Numeric Data Detector 206
  - DateTime Detector 508
  - Currency Detector 510

Data Table 140

| Row ID | First Name | Product | Quantity Purchased | Price per Unit | Total Price | Date of Purchase | StoreID |
|---|---|---|---|---|---|---|---|
| 0001 | Joe | Apple | 12 | $0.75 | $9.00 | 1/10/2016 | 0021 |
| 0002 | Mary | Orange | 18 | $0.5 | $9.00 | 1/25/2016 | 0026 |
| 0003 | Alex | Watermelon | 6 | $2 | $12.00 | 1/14/2016 | 0026 |
| 0004 | Joe | Mango | 24 | $0.6 | $14.40 | 2/1/2016 | 0021 |
| 0005 | Beth | Strawberry | 30 | $0.3 | $9.00 | 1/17/2016 | 0025 |
| 0006 | Joe | Grapes | 40 | $0.3 | $12.00 | 2/12/2016 | 0025 |
| 0007 | Mary | Apple | 12 | $0.75 | $9.00 | 1/11/2016 | 0026 |
| 0008 | Mary | Orange | 6 | $0.5 | $3.00 | 1/21/2016 | 0026 |
| 0009 | Alex | Apple | 8 | $0.75 | $6.00 | 1/16/2016 | 0026 |
| 0010 | Beth | Grapefruit | 10 | $0.75 | $7.50 | 1/5/2016 | 0025 |

Table Metadata 144

| Col. Name | Row ID | First Name | Product | Quantity Purchased | Price per Unit | Total Price | Date of Purchase | StoreID |
|---|---|---|---|---|---|---|---|---|
| Field Type | ID | TEXT | TEXT | INTEGER | CURRENCY | CURRENCY | DATE | REF |

Annotation Data 672:
| Who, Person |
| First Name, Person, Male |
| First Name, Person, Female |
| First Name, Person |
| First Name, Person, Male |
| First Name, Person, Female |
| First Name, Person, Male |
| First Name, Person, Female |
| First Name, Person, Female |
| First Name, Person |
| First Name, Person, Female |

Annotation Data 674:
| Which, What, Fruit |
| Fruit, Apple Id. |
| Fruit, Orange Id. |
| Fruit, Watermelon Id. |
| Fruit, Mango Id. |
| Fruit, Strawberry Id. |
| Fruit, Grapes Id. |
| Fruit, Apple Id. |
| Fruit, Orange Id. |
| Fruit, Apple Id. |
| Fruit, Grapefruit Id. |

Annotation Data 160
- Annotation Data 260
- Annotation Data 262
- Annotation Data 264
- Annotation Data 566
- Annotation Data 568
- Annotation Data 570
- Annotation Data 672
- Annotation Data 674

Annotation Data Generator 106
- Ontology Class Detector 110
- Data Type Detector 112
  - Reference/ID Detector 204
  - Numeric Detector 206
  - DateTime Detector 508
  - Currency Detector 510
  - Category Detector 612
  - Text Detector 614

FIG. 6

NATURAL LANGUAGE QUERYING OF DATA IN A STRUCTURED CONTEXT

CROSS-REFERENCE TO RELATED APPLICATIONS

The present application claims priority to and is a continuation of U.S. patent application Ser. No. 15/705,050 entitled "NATURAL LANGUAGE QUERYING OF DATA IN A STRUCTURED CONTEXT," filed Sep. 14, 2017, the contents of which are incorporated herein by reference in their entirety.

BACKGROUND

Databases are used to form information systems composed of data tables with rows and columns Information can be extracted from the data tables using queries that conform to a specific database query language, such as the structured query language (SQL). As the use of information systems becomes ubiquitous, users with no computing backgrounds have more frequent interactions with databases. The ability of a user to extract meaningful data from an information system is limited by the user's ability to learn a specific database query language.

SUMMARY

Particular implementations of systems and methods for natural language querying in a structured context are described herein. Natural language querying enables a user to extract information within a structured context (e.g., from a database) using human language (e.g., a language used by people to communicate with each other) as compared to a computer language (e.g., a language designed to communicate with a computer). As described herein, an annotation data generator analyzes a data table and generates annotation data corresponding to the data table. The data table includes at least one column and at least one row. For example, a sales data table may include a particular row with a first entry (e.g., "Joe") corresponding to a first column (e.g., "First Name"), a second entry (e.g., "Apple") corresponding to a second column (e.g., "Product"), and a third entry (e.g., "12") corresponding to a third column (e.g., "Quantity Purchased").

The annotation data generator may determine that a particular column corresponds to a particular class of an ontology. For example, the annotation data generator determines that the particular column corresponds to the particular class in response to determining that a column header (e.g., "First Name") corresponds to the particular class (e.g., "Person"). In an illustrative example, the annotation data generator determines that the particular column (e.g., "First Name") corresponds to the particular class in response to determining that one or more entries of the particular column (e.g., "Joe", "Mary", and "Beth") correspond to the particular class (e.g., "Person"). The annotation data generator may determine that a particular entry (e.g., "Joe", "Mary", or "Beth") corresponds to a particular class (e.g., "Person") in response to determining that the ontology indicates that the particular entry is an instance of the particular class. In some examples, the annotation data generator may use disambiguation data from a data source, such as a search engine, a database, a news source, or another data source, to determine that the particular entry is an instance of the particular class. For example, the annotation data generator determines that "Joe", "Mary", and "Beth" correspond to "Person" in response to determining that disambiguation data from a name database indicates that each of "Joe", "Mary", and "Beth" is commonly used as a name for a person. In some examples, the annotation data generator may use a data model to determine that the particular entry is an instance of the particular class. For example, the annotation data generator determines that "Joe", "Mary", and "Beth" correspond to "Person" in response to determining that a data model indicates that each of "Joe", "Mary", and "Beth" is likely to correspond to a name for a person.

The annotation data generator generates annotation data corresponding to the particular column (e.g., "First Name") to indicate that the particular column corresponds to the particular class (e.g., "Person"). The annotation data generator, based on the particular class, adds a label (e.g., "Who") to the annotation data indicating a natural language term that is usable to extract information from the particular column. The annotation data generator may add multiple such labels for each column in the sales data table.

The annotation data generator may also generate entry annotation data corresponding to one or more entries of the particular column. For example, the annotation data generator generates first entry annotation data corresponding to the first entry (e.g., "Joe") of a particular row, the first entry corresponding to the particular column (e.g., "First Name"). The first entry annotation data indicates the particular class (e.g., "Person"). In some examples, the annotation data generator also determines a data type (e.g., "Name" and "Male"), of the first entry (e.g., "Joe") and generates (or updates) the first entry annotation data to indicate the data type. The annotation data generator stores column annotation data (e.g., "Person" and "Who") and entry annotation data (e.g., "Person", "Name", and "Male") as part of or distinct from the sales data table.

Subsequently, a query analyzer may receive a natural language query (e.g., "Who bought more than 10 apples?"). The query analyzer identifies the "First Name" column in response to detecting a match between at least one term (e.g., "Who") of the natural language query (e.g., "Who bought more than 10 apples?") and the annotation data (e.g., "Person" and "Who") corresponding to the "First Name" column. Thus, the query analyzer may use annotation data to determine which column (or columns) the answer for a natural language query should come from. The query analyzer identifies one or more entries of the column as an answer to the query based on a predicate in the natural language query (e.g., "bought more than 10 apples"). For example, the query analyzer determines that the "Quantity Purchased" column is of interest in response to determining that "bought" matches "Purchased" and that the "Product" column is of interest in response to determining that "apples" from the natural language query matches "Apple" in one or more entries of the "Product" column. In some examples, the query analyzer determines that "bought" matches "purchased" based on disambiguation data or a data model.

The query analyzer identifies the first entry (e.g., "Joe") based on detecting a match between the predicate "bought more than 10 apples" and the entries "Apple" from the "Product" column and "12" from the "Quantity Purchased" column. The query analyzer outputs a response indicating the entry "Joe" as the answer to the query.

A user may thus extract information (e.g., "Joe") from the data table using a natural language query (e.g., "Who bought more than 10 apples?") as compared to using a query corresponding to a database specific language (e.g., "Select First Name FROM Table WHERE Product="Apple" AND Quantity Purchased>10"). The user is able to extract the information using a natural language term (e.g., "Who") that is not included in the data table as a column header.

In a particular aspect, a method includes automatically generating, at a processor of a computing device, annotation data indicating that a column of a data table corresponds to a particular class of an ontology. The method also includes storing the annotation data. The method further includes receiving a natural language query. The method also includes generating a second query based on detecting a match between at least one term of the natural language query and the annotation data. The method further includes determining a response to the second query. The method also includes outputting the response to the second query as a response to the natural language query.

In another particular aspect, a computing device includes an input interface, a processor, and an output interface. The input interface is configured to receive a natural language query. The processor is configured to detect that a column of a data table corresponds to a particular class of an ontology. The processor is also configured to generate annotation data indicating that the column corresponds to the particular class. The processor is further configured, in response to determining that no match is detected between a particular term of the natural language query and the column and that no match is detected between the particular term and the annotation data, to provide the particular term as an input to a trained data model and to determine, based on an output from the trained data model, that the particular term corresponds to one or more terms. The processor is also configured to determine a response to the natural language query based on detecting a match between the one or more terms and at least one of the annotation data or the column. The output interface is configured to output the response.

In another particular aspect, a computer-readable storage device stores instructions that, when executed by a processor, cause the processor to perform operations including detecting that a column of a data table corresponds to a particular class of an ontology. The operations also include storing annotation data indicating that the column corresponds to the particular class. The operations further include receiving a natural language query. The operations also include determining that no match is detected between a particular term of the natural language query and the column and that no match is detected between the particular term and the annotation data. The operations further include, in response to the determination, generating a second query based on determining that disambiguation data indicates that the particular term corresponds to at least one of the column or the annotation data. The operations also include determining a response to the second query. The operations further include outputting the response to the second query as a response to the natural language query.

BRIEF DESCRIPTION OF THE DRAWINGS

FIG. 5 illustrates another particular example of data table annotation;

FIG. 6 illustrates another particular example of data table annotation;

DETAILED DESCRIPTION

Figure 1:
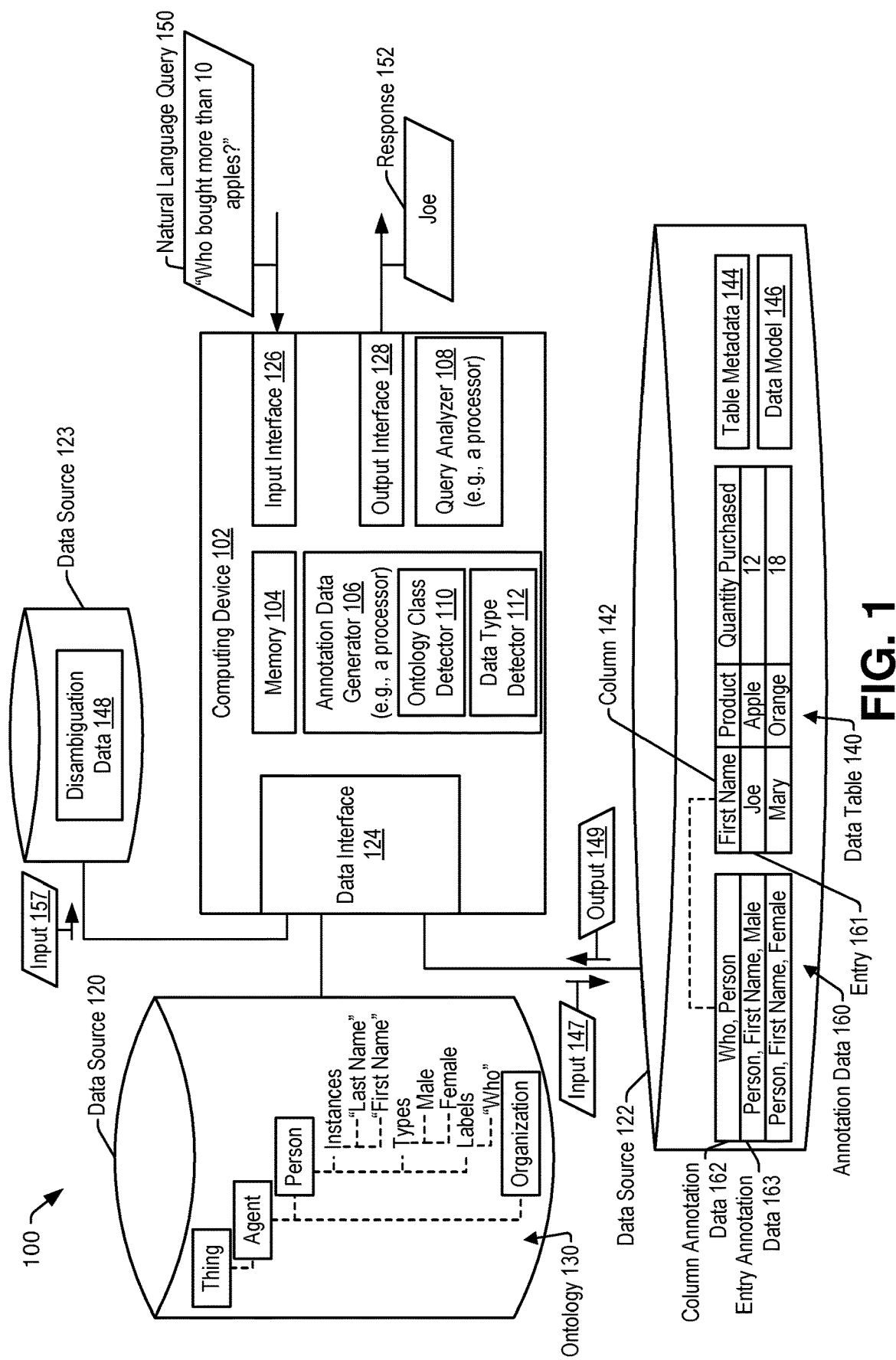
FIG. 1 illustrates a particular example of a system that is operable to perform natural language querying.

FIG. 1 illustrates a first example of a system 100 that is operable to perform natural language querying. The system 100 identifies ontology classes corresponding to columns of a data table. The system 100 may enable natural language querying based on a comparison of the ontological classes of the columns and terms that are based on a natural language query.

The system 100 includes a computing device 102 having an annotation data generator 106 (e.g., a processor and/or processor-executable instructions) configured to generate annotation data of a data table and a query analyzer 108 (e.g., a processor and/or processor-executable instructions) configured to generate a response to a natural language query based on the annotation data. The annotation data generator 106 includes an ontology class detector 110 configured to determine an ontology class corresponding to a column or an entry of a data table. The annotation data generator 106 includes a data type detector 112 configured to determine one or more data types corresponding to an entry of a data table. Although the annotation data generator 106 and the query analyzer 108 are illustrated as included in a single computing device in FIG. 1, in some implementations the computing device 102 includes the annotation data generator 106 and a second computing device (that is distinct from the computing device 102) includes the query analyzer 108.

It should be noted that various functions performed by the system 100 of FIG. 1 are described herein as being performed by certain components or modules. However, this division of components and modules is for illustration only. In an alternate aspect, a function performed by a particular component or module may be divided amongst multiple components or modules. Moreover, in an alternate aspect, two or more components or modules of FIG. 1 may be integrated into a single component or module. Each component or module illustrated in FIG. 1 may be implemented using hardware (e.g., a field-programmable gate array (FPGA) device, an application-specific integrated circuit (ASIC), a digital signal processor (DSP), a controller, etc.), software (e.g., instructions executable by a processor), or any combination thereof.

The computing device 102 includes a smart phone, a mobile communication device, a portable computer, a stationary (e.g., desktop or rack-mounted) computer, a tablet, a personal digital assistant (PDA), a set top box device, a video player, an entertainment unit, a display device, a television, a gaming console, a music player, a radio, a camera, a navigation device, an on-board component of a vehicle, an "internet-of-things" device (such as a smart home controller or sensor), a server, another device, or a combination thereof.

The computing device 102 includes a memory 104, a data interface 124, an input interface 126, and an output interface 128. The annotation data generator 106 may be configured to execute instructions from the memory 104 to perform various operations. For example, the memory 104 may include an annotation data generation application. The query analyzer 108 may be configured to execute instructions from the memory 104 to perform various operations. For example, the memory 104 may include a query analysis application.

The data interface 124 is coupled to a data source 120, a data source 122, a data source 123, or a combination thereof. The data source 120 may be the same as or distinct from the data source 122, the data source 123, or both. The data source 122 may be the same as or distinct from the data source 120, the data source 123, or both. The data source 120, the data source 122, the data source 123, or a combination thereof, may be internal or external to the computing device 102. The data source 120, the data source, 122, the data source 123, or a combination thereof, may be remotely located from the computing device 102. The data source 120 may include one or more servers. The data source 120 is configured to store data representing an ontology 130. The ontology 130 indicates classes and subclasses. In the example of FIG. 1, the ontology 130 includes a class (e.g., "Thing") with a subclass (e.g., "Agent"). The subclass (e.g., "Agent") includes a first subclass (e.g., "Person") and a second subclass (e.g., "Organization"). The ontology 130 may indicate instances of a class (or subclass). For example, the ontology 130 indicates one or more instances (e.g., "First Name" and "Last Name") of the first subclass (e.g., "Person"). The ontology 130 may indicate one or more types of an instance of a class (or subclass). For example, the ontology 130 indicates one or more types (e.g., "Male" or "Female") of an instance of the first subclass (e.g., "Person"). The ontology 130 may indicate labels corresponding to a class (or subclass). For example, the ontology 130 indicates a label (e.g., "Who") corresponding to the first subclass (e.g., "Person").

The data source 122 may include one or more servers. The data source 122 is configured to store one or more data tables, such as an illustrative data table 140. The data table 140 includes at least one column and at least one row. For example, the data table 140 includes a first column 142 (e.g., "First Name"), a second column (e.g., "Product"), and a third column (e.g., "Quantity Purchased"). The data table 140 includes a first row with an entry 161 (e.g., "Joe") in the first column 142 (e.g., "First Name"), a second entry (e.g., "Apple") in the second column (e.g., "Product"), and a third entry (e.g., "12") in the third column (e.g., "Quantity Purchased"). The first row of the data table 140 thus indicates that Joe bought 12 apples. Similarly, a second row of the data table 140 indicates that Mary bought 18 oranges.

The data source 122 is also configured to store table metadata 144 corresponding to the data table 140. The table metadata 144 includes information regarding the data table 140. For example, the table metadata 144 may indicate a field type of a column of the data table 140. The field type includes an identifier (ID) type, a reference (REF) type, a text type, a currency type, a date type, a real type, an integer type, a numeric type, or another type. The data source 122 is configured to store a data model 146 (e.g., a trained data model). The data model 146 represents syntactic and semantic relationships among words, as further described with reference to FIG. 4.

The data source 123 may include one or more servers. The data source 123 may be remotely located from the computing device 102, the data source 120, the data source 122, or a combination thereof. The data source 123 may correspond to at least one of a search engine, a database, a news source, a publicly accessible data source, or another data source. The data source 123 is configured to store disambiguation data 148. For example, the disambiguation data 148 may correspond to search results from a search engine corresponding to a particular term.

The input interface 126 is configured to receive an input from a device, such as a keyboard, a mouse, a microphone, a computing device, a network device, or a combination thereof. The output interface 128 is configured to provide an output to a device, such as a display screen, a speaker, a computing device, a network device, or a combination thereof.

During operation, the annotation data generator 106 receives (or accesses) the data table 140 stored at the data source 122. For example, a user of the computing device 102 may activate the annotation data generator 106 and may select the data table 140 for analysis. The annotation data generator 106 may access the data table 140, via the data interface 124, from the data source 122 in response to receiving the user selection. The annotation data generator 106 generates annotation data 160 by analyzing the data table 140, the table metadata 144, or both. For example, the ontology class detector 110 accesses, via the data interface 124, the ontology 130 stored at the data source 120.

The ontology class detector 110 identifies a particular class (e.g., "Person") of the ontology 130 that corresponds to the first column 142. For example, the ontology class detector 110 identifies the particular class (e.g., "Person") in response to determining that a column header (e.g., "First Name") of the first column 142 corresponds to an instance of the particular class (e.g., "Person") in the ontology 130. In a particular example, the ontology class detector 110 identifies the particular class (e.g., "Person") in response to determining that the data source 123 (e.g., a search engine, a database, a news source, or another data source) indicates that the column header (e.g., "First Name") is commonly associated with the particular class. For example, the ontology class detector 110 provides an input 157 representing the column header (e.g., "First Name") to the data source 123 and receives the disambiguation data 148 corresponding to the input 157 from the data source 123, as further described with reference to FIG. 3. The disambiguation data 148 may indicate that the column header (e.g., "First Name") is commonly associated with the particular class (e.g., "Person"). In a particular example, the ontology class detector 110 identifies the particular class (e.g., "Person") in response to determining that the data model 146 indicates that the column header (e.g., "First Name") is closely associated with the particular class. For example, the ontology class detector 110 provides an input 147 representing the column header (e.g., "First Name") to the data model 146 and receives an output 149 from the data model 146, as further described with respect to FIG. 4. The ontology class detector 110 determines, based on the output 149, that the column header (e.g., "First Name") is closely associated with the particular class (e.g., "Person"), as further described with reference to FIG. 4.

In some implementations, the ontology class detector 110 identifies the particular class (e.g., "Person") based on one or more entries of the first column 142. To illustrate, the ontology class detector 110 selects up to a threshold number of entries of the first column 142. The threshold number may correspond to a default value, a configuration setting, a user input, or a combination thereof. The ontology class detector 110 provides the selected entries to the data type detector 112. The data type detector 112 determines one or more data types of each of the selected entries, as further described with reference to FIGS. 2-6. For example, the data type detector 112 determines that the entry 161 (e.g., "Joe") corresponds to first data types (e.g., "First Name" and "Male") and that the first particular entry (e.g., "Mary") corresponds to second data types (e.g., "First Name" and "Female"). The ontology class detector 110, in response to determining that each of the selected entries has at least one data type (e.g., "First Name") in common, determines the particular class (e.g., "Person") corresponding to the data type. For example, the ontology class detector 110 determines that the data type (e.g., "First Name") corresponds to an instance of the particular class (e.g., "Person").

In a particular aspect, the ontology class detector 110 determines that an entry corresponds to one or more data types, one or more classes, or a combination thereof, based on the data source 123 (e.g., a search engine, a database, a news source, or another data source). For example, the ontology class detector 110 determines that the entry 161 (e.g., "Joe") corresponds to the first data types (e.g., "First Name" and "Male"), the particular class (e.g., "Person"), or both, in response to determining that the disambiguation data 148 indicates that the entry 161 (e.g., "Joe") is commonly used as a first name of a person who is male. Similarly, the ontology class detector 110 may determine that first particular entry (e.g., "Mary") corresponds to "First Name" and "Female" data types, the "Person" class, or a combination thereof, in response to determining that the disambiguation data 148 indicates that Mary is commonly used as a first name of a person who is female.

In a particular aspect, the ontology class detector 110 determines that an entry corresponds to one or more data types, one or more classes, or a combination thereof, based on the data model 146. For example, the ontology class detector 110 determines that the entry 161 (e.g., "Joe") corresponds to the first data types (e.g., "First Name" and "Male"), the particular class (e.g., "Person"), or both, in response to determining based on the output 149 from the data model 146 that the entry 161 (e.g., "Joe") is commonly associated with "first name" and "male". Similarly, the ontology class detector 110 may determine that first particular entry (e.g., "Mary") corresponds to "First Name" and "Female" data types, the "Person" class, or a combination thereof, in response to determining based on the output 149 from the data model 146 that Mary is closely associated with "first name" and "female". Alternatively, the ontology class detector 110, in response to determining that first data types of an entry of the selected entries do not have any data types in common with second data types of another entry of the selected entries, determine that the first column 142 corresponds to a default class (e.g., "Text").

In a particular aspect, the ontology class detector 110, in response to determining that the data table 140 includes the column header of the first column 142, determines the particular class based on the column header and independently of the entries of the first column 142. Alternatively, the ontology class detector 110, in response to determining that the data table 140 excludes a column header for the first column 142, determines the particular class based on selected entries of the first column 142.

The ontology class detector 110 generates column annotation data 162 indicating that the first column 142 corresponds to the particular class (e.g., "Person"). The ontology class detector 110 generates (or updates) the column annotation data 162 to indicate the label (e.g., "Who"). The annotation data 160 includes the column annotation data 162. Similarly, the ontology class detector 110 determines classes of the ontology 130 corresponding to other columns of the data table 140 and updates the annotation data 160 to indicate the classes and corresponding labels. For example, the ontology class detector 110 may update the annotation data 160 to indicate that the "Product" column of the data table 140 corresponds to classes, such as "Food", "Fruit", "Produce", etc., and to labels, such as "Which" and "What".

The ontology class detector 110 updates the annotation data 160 to indicate entry annotation data associated with entries of the data table 140. For example, the ontology class detector 110 updates the annotation data 160 to include entry annotation data 163 corresponding to the entry 161 of the first column 142. The entry annotation data 163 indicates the particular class (e.g., "Person").

The ontology class detector 110 provides each entry of the first column 142 to the data type detector 112. For example, the ontology class detector 110 provides the entry 161 to the data type detector 112. The ontology class detector 110 updates the entry annotation data corresponding to a particular entry in response to determining that the data type detector 112 identified at least one data type of the particular entry. For example, the data type detector 112 determines first data types (e.g., "First Name" and "Male") corresponding to the entry 161 (e.g., "Joe"), as further described with reference to FIGS. 2-6. The ontology class detector 110 updates the entry annotation data 163 to indicate the first data types (e.g., "First Name" and "Male") in response to determining that the data type detector 112 identified at least one data type corresponding to the entry 161. Similarly, the ontology class detector 110 provides entries of other columns of the data table 140 to the data type detector 112 and generates entry annotation data indicating corresponding data types.

In a particular implementation, the annotation data generator 106 stores the annotation data 160 with the data table 140 at the data source 122. For example, the annotation data generator 106 updates the data table 140, the table metadata 144, or both, to indicate the annotation data 160. In an alternate implementation, the annotation data generator 106 stores the annotation data 160 separately from the data table 140, such as in a different data structure, a different storage device, a different computing device, etc.

Subsequently, the query analyzer 108 receives a natural language query 150 (e.g., "Who bought more than 10 apples?") via the input interface 126. The query analyzer 108 generates a response 152 to the natural language query 150 (as further described with reference to FIG. 7-10). For example, the query analyzer 108 compares one or more terms based on the natural language query 150 to annotation data corresponding to columns of the data table 140. In a particular example, the one or more terms include at least one term of the natural language query 150, at least one term indicated by the disambiguation data 148 as corresponding to the natural language query 150, at least one term indicated by the data model 146 as corresponding to the natural language query 150, or a combination thereof, as further described with reference to FIGS. 7-10. The query analyzer 180 compares the one or more terms to the column header (e.g., "First Name"), the column annotation data 162 (e.g., "Who" and "Person"), or both, corresponding to the first column 142. The query analyzer 180, in response to detecting a match between at least one term based on the natural language query 150 (e.g., "Who") and the column annotation data 162 (e.g., "Who" and "Person"), generates a partial database query (e.g., "select First Name from Data Table") that selects one or more entries from the first column 142.

The query analyzer 180 determines that the natural language query 150 includes a predicate (e.g., "bought more than 10 apples"). The query analyzer 180 adds a clause (e.g., "where Product="Apple" and Quantity Purchased>10") to the database query such that entries of the first column 142 that satisfy the predicate are selected. The query analyzer 180 generates "Product="Apple"" based on determining that the term "apples" of the natural language query 150 matches an entry in the "Product" column of the data table 140. The query analyzer 180 generates "Quantity Purchased>10" based on determining that the "Quantity Purchased" column corresponds to "bought" of the natural language query 150 and that "more than" maps to the mathematical greater than (">") function. The query analyzer 180 may determine that "Quantity Purchased" corresponds to "bought" based on the disambiguation data 148, the data model 146, or both, as further described with reference to FIGS. 7-9. The query analyzer 180 generates the response 152 indicating a result (e.g., "Joe") of applying the formed database query (e.g., "select First Name from Data Table where Product="Apple" and Quantity Purchased>10") to the data table 140. The query analyzer 180 outputs the response 152 (e.g., "Joe") via the output interface 128.

The system 100 thus enables a user to extract information from data tables using natural language queries rather than requiring a user to input a database query in a database specific language (e.g., "Select First Name FROM Data Table WHERE Product="Apple" AND Quantity Purchased>10"). Natural language querying may be more intuitive for a large number of users and may make information more accessible to users without prior computing education.

Figure 2:
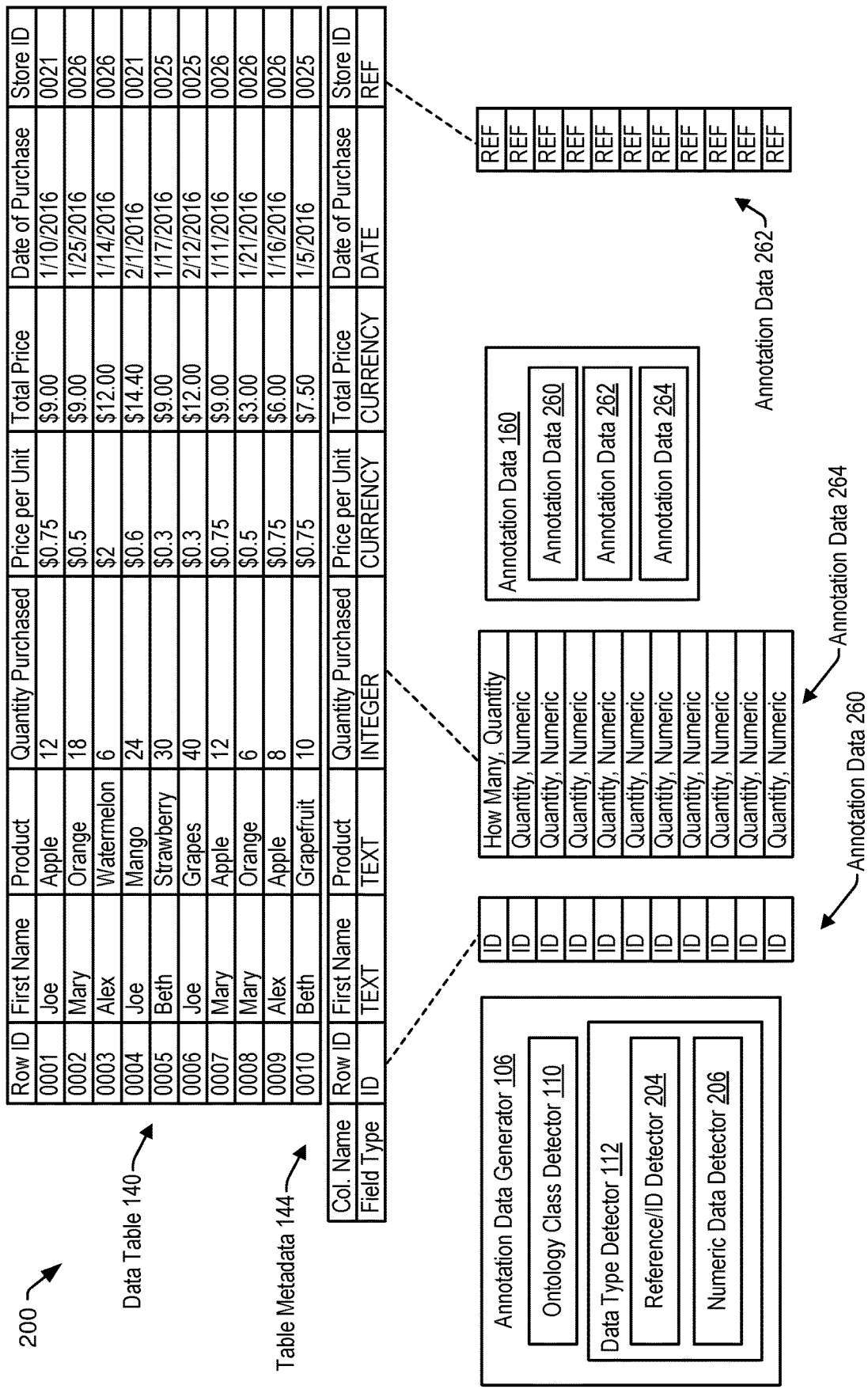
FIG. 2 illustrates a particular example of data table annotation.

FIG. 2 illustrates an example 200 of data table annotation performed by the annotation data generator 106. The data type detector 112 includes a reference/ID detector 204, a numeric data detector 206, or both. The reference/ID detector 204 is configured to determine whether an entry corresponds to either one of a reference (REF) data type or an identifier (ID) data type. The ID data type corresponds to an identifier (e.g., a primary key) of a row that includes the entry. The REF data type corresponds to an identifier (e.g., a foreign key) of another row in the same data table or in another data table.

The data table 140 includes a "Row ID" column, a "First Name" column, a "Product" column, a "Quantity Purchased" column, a "Price per Unit" column, a "Total Price" column", a "Date of Purchase" column, a "Store ID" column. The table metadata 144 may indicate a field type for a corresponding column. For example, the table metadata 144 indicates that the "Row ID" column corresponds to an "ID" field type, the "First Name" column corresponds to a "Text" field type, the "Product" column corresponds to a "Text" field type, the "Quantity Purchased" column corresponds to an "Integer" field type, the "Price per Unit" column corresponds to a "CURRENCY" field type, the "Total Price" column corresponds to the "CURRENCY" field type, the "Date of Purchase" column corresponds to a "DATE" field type, and the "Store ID" column corresponds to a REF field type.

During operation, the ontology class detector 110 determines that a particular column corresponds to a particular class of the ontology 130 of FIG. 1. For example, the ontology class detector 110 determines that the particular column corresponds to the particular class in response to determining that the ontology 130 indicates that a column header of the particular column corresponds to an instance of the particular class. To illustrate, the ontology class detector 110 determines that the "Row ID" column corresponds to an "ID" class of the ontology 130 in response to determining that the ontology 130 indicates that a column header (e.g., "Row ID") of the "Row ID" column corresponds to an instance of the "ID" class. In some implementations, as further described with reference to FIG. 3, the ontology class detector 110 determines that the disambiguation data 148 indicates that the column header (e.g., "Row ID") corresponds to the "ID" class. In some implementations, as further described with reference to FIG. 4, the ontology class detector 110 determines, based on the data model 146, that the column header (e.g., "Row ID") corresponds to the "ID" class. Similarly, the ontology class detector 110 determines that the "Store ID" column corresponds to a "REF" class of the ontology 130, that the "Quantity Purchased" column corresponds to a "Quantity" class of the ontology 130, or both.

In a particular aspect, the ontology class detector 110 determines that the "Row ID" column corresponds to the "ID" class in response to determining that a column header (e.g., "Row ID") of the column is associated with the "ID" class, such as a default column header for the "ID" class. In this aspect, the ontology class detector 110 may determine that the "Store ID" column corresponds to the "REF" class in response to determining that the column header (e.g., "Store ID") includes a particular term (e.g., "ID") and that the column header is distinct from a particular column header (e.g., "Row ID") associated with the "ID" class.

In some implementations, the ontology class detector 110 determines that a particular column corresponds to a particular class of the ontology 130 in response to determining that at least a threshold number of entries of the particular column correspond to a particular data type and that the ontology 130 indicates that the particular data type corresponds to a data type of the particular class. For example, the ontology class detector 110 determines that the "Row ID" column corresponds to the "ID" class in response to determining that at least a threshold number of entries of the "Row ID" column correspond to the "ID" data type and that the ontology 130 indicates that the "ID" data type is a type of the "ID" class. To illustrate, the ontology class detector 110 provides at least the threshold number of entries to the data type detector 112 and, in response to determining that the data type detector 112 indicates that the provided entries correspond to the "ID" data type and that the ontology 130 indicates that the "ID" data type is a type of the "ID" class, determines that the "Row ID" column corresponds to the "ID" class.

In some implementations, the ontology class detector 110 determines that a particular column correspond to a particular class of the ontology 130 in response to determining that the table metadata 144 indicates that the particular column corresponds to a particular field type and that the ontology 130 indicates that the particular field type corresponds to a data type of the particular class. For example, the ontology class detector 110 determines that the "Row ID" column corresponds to the "ID" class in response to determining that the field type of the "Row ID" column corresponds to the "ID" field type and that the ontology 130 indicates that the "ID" field type corresponds to a data type of the "ID" class.

The ontology class detector 110 generates column annotation data indicating that the particular column corresponds to the particular class. For example, the ontology class detector 110 generates first column annotation data indicating that the "Row ID" column corresponds to the "ID" class. The ontology class detector 110 generates (or updates) annotation data 260 to indicate the first column annotation data (e.g., "ID" class). Similarly, the ontology class detector 110 may generate second column annotation data indicating that the "Store ID" column corresponds to the "REF" class and may generate annotation data 262 indicating the second column annotation data. The ontology class detector 110 may generate third column annotation data indicating that the "Quantity Purchased" column corresponds to the "Quantity" class and may generate annotation data 264 indicating the third column annotation data. The annotation data 160 includes the annotation data 260, the annotation data 262, the annotation data 264, or a combination thereof.

The ontology class detector 110 updates the column annotation data to indicate one or more labels associated with the particular class. For example, the ontology class detector 110, in response to determining that the ontology 130 indicates at least one label (e.g., "How" or "How many") corresponding to the particular class (e.g., "Quantity"), updates the third column annotation data to indicate the at least one label. The annotation data 264 includes the updated third column annotation data.

In some implementations, the ontology class detector 110 generates entry annotation data corresponding to entries of a particular column. For example, the ontology class detector 110 provides entries of the particular column to the data type detector 112. The data type detector 112 determines whether a particular entry corresponds to a first data type of a set of data types, as described with reference to FIGS. 2-6. The data type detector 112, in response to determining that the data type detector 112 indicates that the particular entry corresponds to the first data type, provides output to the ontology class detector 110 indicating that the particular entry corresponds to the first data type. In a particular aspect, the data type detector 112, in response to determining that the particular entry does not correspond to the first data type, determines whether the particular entry corresponds to a second data type of the set of data types. The data type detector 112, in response to determining that the particular entry does not correspond to any of the set of data types, determines that the particular entry corresponds to a default data type (e.g., "Text" data type). The ontology class detector 110, in response to determining that the data type detector 112 indicates that the particular entry corresponds to a particular data type, generates entry annotation data indicating that the particular entry corresponds to the particular data type.

The reference/ID detector 204 of the data type detector 112 determines whether an entry corresponds to one of the "REF" data type or the "ID" data type. For example, the reference/ID detector 204 determines that an entry of a particular column (e.g., the "Row ID" column) corresponds to the "ID" data type in response to determining that the table metadata 144 indicates that the particular column corresponds to the "ID" field type. Similarly, the reference/ID detector 204 determines that an entry of a particular column (e.g., the "Store ID" column) corresponds to the "REF" data type in response to determining that the table metadata 144 indicates that the particular column corresponds to the "REF" field type.

The numeric data detector 206 is configured to determine whether an entry corresponds to a numeric data type. For example, the numeric data detector 206 determines that an entry of a particular column (e.g., the "Quantity Purchased" column) corresponds to the numeric data type in response to determining that the table metadata 144 indicates that the particular column corresponds to a particular field type. In some examples, the particular field type includes an "INTEGER" field type, a "FLOAT" field type, a "DECIMAL" field type, a "BINARY" field type, a "SMALLINT" field type, a "BIGINT" field type, a "REAL" field type, a "DOUBLE PRECISION" field type, or a "NUMERIC" field type.

In a particular aspect, the numeric data detector 206 determines that an entry of a particular column (e.g., the "Quantity Purchased" column) corresponds to the numeric data type in response to determining that a value of the entry satisfies a regular expression corresponding to a numeric value. For example, the numeric data detector 206 determines that the entry of the particular column corresponds to the numeric data type in response to determining that the value (e.g., "12") of the entry satisfies a first regular expression corresponding to an integer value or a second regular expression corresponding to a decimal value.

The ontology class detector 110, in response to determining that the data type detector 112 indicates that a particular entry of a particular column corresponds to a particular data type, generates entry annotation data indicating that the particular entry corresponds to the particular data type. For example, the ontology class detector 110 generates first entry annotation data indicating that a first entry of the "Row ID" column corresponds to the "ID" data type, second entry annotation data indicating that a second entry of the "Store ID" column corresponds to the "REF" data type, third entry annotation data indicating that a third entry of the "Quantity Purchased" column corresponds to the numeric data type, or a combination thereof.

In a particular aspect, the ontology class detector 110 updates entry annotation data to indicate an ontology class of the corresponding column. For example, the ontology class detector 110 updates the first entry annotation data to indicate a first ontology class (e.g., the "ID" class) of the "Row ID" column, the second entry annotation data to indicate a second ontology class (e.g., the "REF" class) of the "Store ID" column, the third entry annotation data to indicate a third ontology class (e.g., the "Quantity" class) of the "Quantity Purchased" column, or a combination thereof.

In a particular aspect, the ontology class detector 110 determines a first ontology class of an entry based on the disambiguation data 148, as further described with reference to FIG. 3. In a particular aspect, the ontology class detector 110 determines a second ontology class of an entry based on the data model 146, as further described with reference to FIG. 4.

The ontology class detector 110 updates annotation data of the particular column to include the entry annotation data. For example, the ontology class detector 110 updates the annotation data 260 to indicate the first entry annotation data, the annotation data 262 to indicate the second entry annotation data, the annotation data 264 to indicate the third entry annotation data, or a combination thereof.

Figure 3:
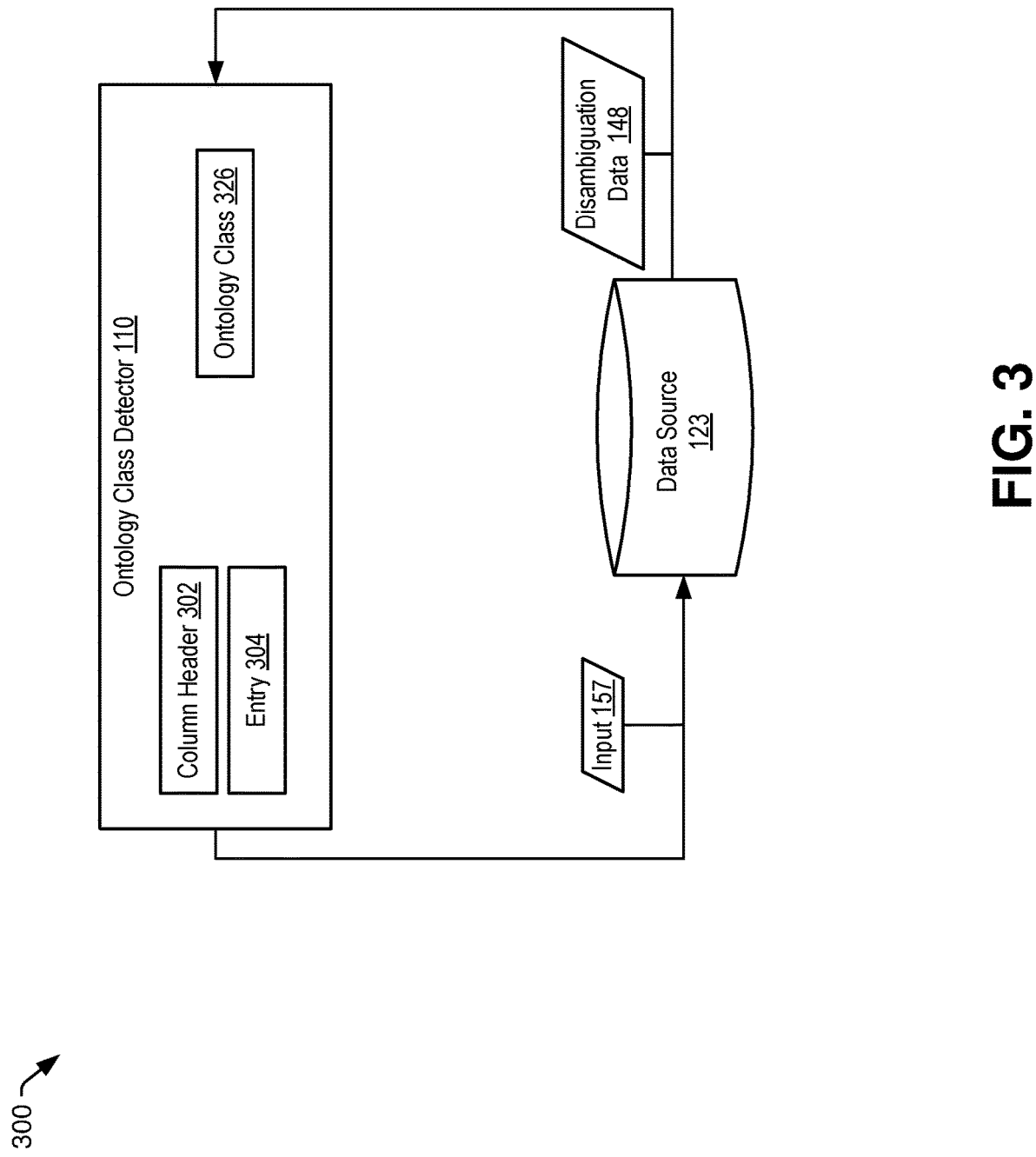
FIG. 3 illustrates another particular example of data table annotation based on disambiguation data.

FIG. 3 illustrates an example 300 of data table annotation performed by the ontology class detector 110. The ontology class detector 110 provides the input 157 to the data source 123. In a particular example, the input 157 corresponds to a column header 302 of a particular column of the data table 140 of FIG. 1. In another example, the input 157 corresponds to an entry 304 (or a value of the entry 304) of a column of the data table 140.

The ontology class detector 110 receives the disambiguation data 148 from the data source 123. For example, the data source 123 may correspond to a search engine and the disambiguation data 148 may corresponds to results of performing a search based on the input 157. The disambiguation data 148 may indicate an ontology class 326 of the input 157. For example, the input 157 may correspond to a name of a landmark (e.g., "White House"), and the disambiguation data 148 may indicate that the input 157 is related to the ontology class 326. In a particular aspect, the ontology class detector 110 generates (or updates) column annotation data to indicate that the particular column corresponds to the ontology class 326. In another aspect, the ontology class detector 110 generates (or updates) entry annotation data to indicate that the entry 304 corresponds to the ontology class 326.

In a particular aspect, the ontology class detector 110 stores the disambiguation data 148 at the memory 104, the data source 122, or both. The disambiguation data 148 may be retrievable using a particular identifier associated with the input 157 (e.g., "White House"). For example, the particular identifier may correspond to a memory address of a location at which the disambiguation data 148 is stored. As another example, the particular identifier may correspond to a unique identifier associated with the input 157. To illustrate, the input 157 may correspond to a name of a person and the particular identifier may correspond to a social security number. The ontology class detector 110 stores the particular identifier in the column annotation data or the entry annotation data. Examples of entry annotation data including a particular identifier are further described with reference to FIG. 6.

The data source 123 may be external to the computing device 102. Retrieving the disambiguation data 148 corresponding to the input 157 enables the computing device 102 to have access to additional information associated with data that is included in the data table 140 without pre-emptively retrieving additional information associated with all the data that could possibly be included in the data table 140. Storing the disambiguation data 148 corresponding to data that is included in the data table 140 uses fewer memory resources as compared to storing additional information corresponding to all the possible data that could be included in the data table 140. The query analyzer 108 may use the disambiguation data 148 (e.g., the stored data) to determine the response 152 to the natural language query 150, as further described with reference to FIG. 7.

Figure 4:
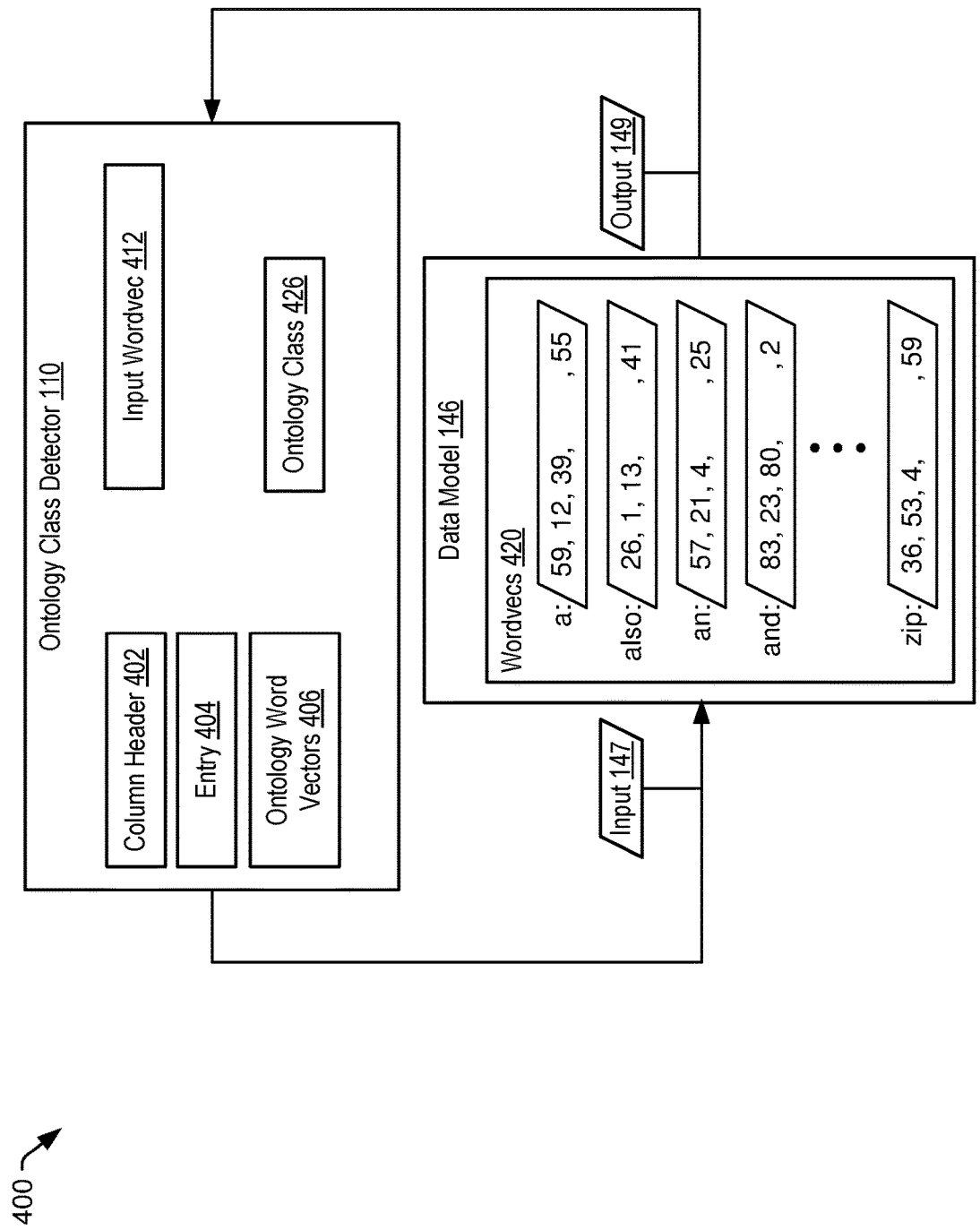
FIG. 4 illustrates another particular example of data table annotation based on a data model.

FIG. 4 illustrates an example 400 of data table annotation performed by the ontology class detector 110. The data model 146 includes a plurality of word vectors (wordvecs) 420. A word vector refers to a vector or other data structure that represents syntactic and semantic relationships among words in an analyzed set of documents. Each wordvec includes a plurality of fields, and each field is assigned a value (e.g., a floating point value). The values may be thought of as representing locations (e.g., coordinates) in a feature vector space that has a number of orthogonal axes corresponding to the number of fields in the wordvec.

In a particular aspect, the wordvecs 420 are associated with a particular context (e.g., a particular language, a medical context, or a political context). For example, the wordvecs 420 are based on analyzing a set of documents associated with the particular context (e.g., documents in the particular language, medical literature, or a website associated with a particular political ideology). The wordvecs 420 may be previously generated by the computing device 102 or by another device. In a particular aspect, the computing device 102 has access to multiple data models including the data model 146. In this aspect, the ontology class detector 110 selects the data model 146 in response to determining that the particular context associated with the data model 146 matches a context associated with the data table 140.

The ontology class detector 110 provides the input 147 to the data model 146. In a particular example, the input 147 corresponds to a column header 402 of a particular column of the data table 140. In another example, the input 147 corresponds to an entry 404 (or a value of the entry 404) of a particular column of the data table 140. The data model 146 provides an output 149 to the ontology class detector 110. For example, the data model 146, in response to determining that the wordvecs 420 do not include any wordvecs corresponding to the input 147, provides the output 149 indicating that no corresponding wordvecs was found. Alternatively, the data model 146, in response to determining that the wordvecs 420 include an input wordvec 412 corresponding to the input 147, provides the input wordvec 412 to the ontology class detector 110.

The ontology class detector 110 has access to a plurality of ontology wordvecs 406. For example, the data model 146 indicates that a first ontology wordvec of the ontology wordvecs 406 corresponds to a first ontology class 426 of the ontology 130 of FIG. 1 and that a second ontology wordvec of the ontology wordvecs 406 corresponds to a second ontology class of the ontology 130.

The ontology class detector 110 generates similarity metrics based on a comparison of the input wordvec 412 with the ontology wordvecs 406. For example, the ontology class detector 110 generates a first similarity metric based on a comparison (e.g., a vector difference) of the input wordvec 412 with the first ontology wordvec corresponding to the first ontology class (e.g., "Person") and a second similarity metric based on a comparison (e.g., a vector difference) of the input wordvec 412 with the second ontology wordvec corresponding to the second ontology class (e.g., "Organization").

The ontology class detector 110 identifies a subset of the ontology classes of the ontology 130 are likely related to the input 147. For example, the ontology class detector 110 determines that the subset includes the first ontology class (e.g., "Person") in response to determining that the first similarity metric satisfies a comparison threshold. The ontology class detector 110 determines that the subset does not include the second ontology class (e.g., "Organization") in response to determining that the second similarity metric fails to satisfy the comparison threshold.

The ontology class detector 110 designates a first ontology class 426 of the subset as corresponding to the input 147 in response to determining that the input 147 is more closely related to the first ontology class 426 as compared to the other ontology classes of the subset.

In a particular example, the ontology class detector 110 determines a first similarity metric based on a comparison of the input wordvec 412 corresponding to the input 147 and the first ontology wordvec corresponding to the first ontology class (e.g., the "Person" class). The ontology class detector 110 determines a second similarity metric based on a comparison of the input wordvec 412 and the second ontology wordvec corresponding to a second ontology class (e.g., the "Organization" class). The first similarity metric indicates a first difference between the input 147 and the first ontology class, and the second similarity metric indicates a second difference between the input 147 and the second ontology class.

The ontology class detector 110 determines that the input wordvec 412 is more closely related to the first ontology class (e.g., the "Person" class) than to the second ontology class (e.g., the "Organization" class) in response to determining that a comparison of the first similarity metric and the second similarity metric indicates that the first difference is lower than the second difference. In a particular aspect, the ontology class detector 110, in response to determining that the first similarity metric is less than the second similarity metric, determines that the input wordvec 412 is more closely related to the first ontology class (e.g., the "Person" class) than to the second ontology class (e.g., the "Organization" class).

In a particular example, when the input 147 corresponds to the column header 402 (e.g., "First Name"), the ontology class detector 110 designates the "Person" class as corresponding to the input 147 in response to determining that a first similarity metric corresponding to a difference between the "Person" class (e.g., the first ontology class 426) and the column header 402 has a lower value than other similarity metrics. Alternatively, when the input 147 corresponds to the entry 404 (e.g., "Apple"), the ontology class detector 110 designates the "Fruit" class as corresponding to the input 147 in response to determining that a first similarity metric corresponding to a difference between the "Fruit" class (e.g., the first ontology class 426) and the entry 404 has a lower value than other similarity metrics.

The ontology class detector 110 updates (or generates) annotation data indicating that the input 147 corresponds to the first ontology class 426. For example, the ontology class detector 110, in response to determining that the input 147 (e.g., "First Name") corresponds to the column header 402, updates (or generates) the column annotation data 162 to indicate that the first column 142 (e.g., the "First Name" column) corresponds to the first ontology class 426 (e.g., the "Person" class). Alternatively, the ontology class detector 110, in response to determining that the input 147 (e.g., "Apple") corresponds to the entry 404, updates (or generates) entry annotation data to indicate that the entry 404 (e.g., "Apple") corresponds to the first ontology class 426 (e.g., the "Fruit" class).

In a particular aspect, the ontology class detector 110 designates multiple ontology classes (including the first ontology class 426) as corresponding to the input 147 in response to determining that the input 147 is closer to a first number of ontology classes among the ontology classes of the ontology 130. For example, the ontology class detector 110 designates the first ontology class 426 and the second ontology class as corresponding to the input 147 in response to determining that each of the first similarity metric and the second similarity metric is included in a first number of similarity metrics that indicate the lowest differences. In this aspect, the ontology class detector 110 updates (or generates) annotation data indicating that the input 147 corresponds to the first ontology class 426 and the second ontology class. For example, when the input 147 corresponds to the column header 402 (e.g., "First Name"), the ontology class detector 110 updates (or generates) the column annotation data 162 to indicate that the first column 142 (e.g., the "First Name" column) corresponds to the first ontology class 426 (e.g., the "Person" class) and the second ontology class (e.g., an "Entity" class). As another example, when the input 147 corresponds to the entry 404 (e.g., "Apple"), the ontology class detector 110 updates (or generates) entry annotation data to indicate that the entry 404 corresponds to the first ontology class 426 (e.g., the "Fruit" class) and the second ontology class (e.g., a "Food" class).

In a particular implementation, the ontology class detector 110 designates the first ontology class 426 as corresponding to the input 147 in response to determining that the first similarity metric satisfies (e.g., is less than) a metric threshold. For example, a particular similarity metric that fails to satisfy the metric threshold is too distantly related to the input 147 to be designated as corresponding to the input 147.

FIG. 5 illustrates an example 500 of data annotation performed by the annotation data generator 106. The data type detector 112 includes a datetime detector 508 and a currency detector 510. The datetime detector 508 is configured to determine whether an entry corresponds to a datetime data type. For example, the datetime detector 508 determines that an entry of a particular column (e.g., the "Date of Purchase" column) corresponds to the datetime data type in response to determining that the table metadata 144 indicates that the particular column corresponds to a particular field type (e.g., a "DATE" field type).

In a particular aspect, the datetime detector 508 determines that an entry of a particular column (e.g., the "Date of Purchase" column) corresponds to the datetime data type in response to determining that a value of the entry satisfies a regular expression corresponding to a datetime value. For example, the datetime detector 508 determines that the entry of the particular column corresponds to the datetime data type in response to determining that the value (e.g., "1/10/2016") of the entry satisfies a first regular expression corresponding to a date value, a second regular expression corresponding to a time value (e.g., "12:00 PM"), or a third regular expression corresponding to a datetime value (e.g., "1/10/2016 12:00").

The ontology class detector 110, in response to determining that the datetime detector 508 indicates that a first entry of a particular column (e.g., the "Date of Purchase" column) corresponds to the datetime data type, generates entry annotation data indicating that the first entry corresponds to the datetime data type. In a particular aspect, the entry annotation data may be based on the particular regular expression that matches the first entry. For example, the ontology class detector 110 generates first entry annotation data (e.g., "Day of Year") in response to determining that the first entry satisfies the first regular expression, second entry annotation data (e.g., "TIME OF DAY") in response to determining that the first entry satisfies the second regular expression, or third entry annotation data (e.g., "TIME OF YEAR") in response to determining that the first entry satisfies the third regular expression. It should be understood that the first regular expression, the second regular expression, and the third regular expression are described for ease of illustration. In other examples, the datetime detector 508 determines that the entry of the particular column corresponds to the datetime data type based on fewer than 3 regular expressions, more than 3 regular expressions, a different regular expression, or a combination thereof. The ontology class detector 110 generates (or updates) annotation data 566 corresponding to the "Date of Purchase" column to include the entry annotation data. The ontology class detector 110 may also generate (or update) the annotation data 566 to include column annotation data, as described with reference to FIGS. 1-4, corresponding to the "Date of Purchase" column.

The currency detector 510 is configured to determine whether an entry corresponds to a currency data type. For example, the currency detector 510 determines that an entry of a particular column (e.g., the "Price per Unit" column)

corresponds to the currency data type in response to determining that the table metadata 144 indicates that the particular column corresponds to a particular field type (e.g., a "CURRENCY" field type).

In a particular aspect, the currency detector 510 determines that an entry of a particular column (e.g., the "Price per Unit" column) corresponds to the currency data type in response to determining that a value of the entry satisfies a regular expression corresponding to a currency value. For example, the currency detector 510 determines that the entry of the particular column corresponds to the currency data type in response to determining that the value (e.g., "$0.75") of the entry satisfies a first regular expression corresponding to a dollar value, a second regular expression corresponding to a pound value, or another regular expression corresponding to another currency value.

The ontology class detector 110, in response to determining that the currency detector 510 indicates that a first entry of a particular column (e.g., the "Price per Unit" column) corresponds to the currency data type, generates entry annotation data indicating that the first entry corresponds to the currency data type. In a particular aspect, the entry annotation data may be based on the particular regular expression that matches the first entry. For example, the ontology class detector 110 generates first entry annotation data (e.g., "DOLLARS") in response to determining that the first entry satisfies the first regular expression, second entry annotation data (e.g., "POUNDS") in response to determining that the first entry satisfies the second regular expression, or other entry annotation data in response to determining that the first entry satisfies another regular expression.

The ontology class detector 110 generates (or updates) annotation data 568 corresponding to the particular column (e.g., the "Price per Unit" column) to include the entry annotation data (e.g., the first entry annotation data, the second entry annotation data, or the other annotation data). The ontology class detector 110 may also generate (or update) the annotation data 568 to include column annotation data, as described with reference to FIGS. 1-4, corresponding to the particular column (e.g., the "Price per Unit" column).

Similarly, the ontology class detector 110 generates entry annotation data indicating that a first entry of the "Total Price" column corresponds to the currency data type. The ontology class detector 110 generates (or updates) annotation data 570 corresponding to the "Total Price" column to include the entry annotation data. The ontology class detector 110 may also generate (or update) the annotation data 570 to include column annotation data, as described with reference to FIGS. 1-4, corresponding to the "Total Price" column.

FIG. 6 illustrates an example 600 of data annotation performed by the annotation data generator 106. The data type detector 112 includes a category detector 612 and a text detector 614. The category detector 612 is configured to determine whether an entry of a particular column corresponds to a category data type. A category data type has a particular number (e.g., a fixed number) of possible values, such as hypertext transfer protocol (HTTP) status codes.

The category detector 612 may determine that the particular column includes a first number of unique values. For example, the category detector 612 determines that the "Product" column includes a first number (e.g., 7) of unique values (e.g., "Apple", "Orange", "Watermelon", "Mango", "Strawberry", "Grapes", and "Grapefruit"). The category detector 612 may, in response to determining that the first number (e.g., 7) satisfies (e.g., is less than or equal to) a category count threshold, determine that entries of the particular column likely correspond to a particular category.

The category detector 612 may identify the particular category in various ways. For example, the category detector 612 identifies the particular category based on the ontology 130. To illustrate, the category detector 612 determines that each of the unique values (e.g., "Apple", "Orange", "Watermelon", "Mango", "Strawberry", "Grapes", and "Grapefruit") is indicated as corresponding to (e.g., is an instance of or a type of) a particular class (e.g., "Fruit") in the ontology 130 of FIG. 1. In this example, the category detector 612, in response to the determination, designates the entries of the particular column (e.g., the "Product" column) as corresponding to a category data type that is associated with the particular class (e.g., "Fruit").

In a particular aspect, the category detector 612 determines that the unique values (e.g., "Apple", "Orange", "Watermelon", "Mango", "Strawberry", "Grapes", and "Grapefruit") do not correspond to a common class of the ontology 130, that a first unique value (e.g., "Orange") corresponds to a first class (e.g., a "Citrus" class) of the ontology 130, and that a second unique value (e.g., "Strawberry") corresponds to a second class (e.g., a "Berry" class) of the ontology 130. In a particular implementation, the category detector 612, in response to the determination, designates the entry as not corresponding to a category data type. In another particular implementation, the category detector 612 generates a first ontology class (e.g., a "Citrus or Berry" class) based on the first class and the second class. The category detector 612 adds the first ontology class (e.g., the "Citrus or Berry" class) to the ontology 130. For example, the category detector 612 adds the first ontology class (e.g., the "Citrus or Berry" class) to the ontology 130 such that the first class (e.g., the "Citrus" class) and the second class (e.g., the "Berry" class) are subclasses of the first ontology class. In this implementation, the category detector 612 designates each of the entries of the particular column (e.g., the "Product" column) as corresponding to a category data type that is associated with the first ontology class (e.g., the "Citrus or Berry" class).

In a particular example, the category detector 612 identifies the particular category based on the data model 146 of FIG. 1. For example, the category detector 612 provides each particular value of the unique values (e.g., "Apple", "Orange", "Watermelon", "Mango", "Strawberry", "Grapes", and "Grapefruit") as the input 147 of FIG. 1 to the data model 146 and receives the output 149 from the data model 146. The category detector 612, in response to determining that the output 149 indicates the input wordvec 412 of FIG. 4 corresponding to the input 147, stores the input wordvec 412 in the memory 104 of FIG. 1.

The category detector 612 identifies the particular category based on the input wordvecs corresponding to the unique values. For example, the input wordvecs include a first wordvec corresponding to a first value (e.g., "Apple") of the unique values. The category detector 612 compares the first wordvec (e.g., the input wordvec 412) with each of the ontology wordvecs 406 of FIG. 4 and determines that the first value (e.g., "Apple") corresponds to a first subset of ontology classes of the ontology 130, as described with reference to FIG. 4. For example, the category detector 612 determines that the first value (e.g., "Apple") corresponds to a first class (e.g., the "Fruit" class) and a second class (e.g., a "Tree" class).

Similarly, the category detector 612 identifies a particular subset of ontology classes of the ontology 130 corresponding to each of the unique values (e.g., "Apple", "Orange", "Watermelon", "Mango", "Strawberry", "Grapes", and "Grapefruit"). For example, the input wordvecs include a second wordvec corresponding to a second value (e.g., "Orange"). The category detector 612 compares the second wordvec with each of the ontology wordvecs 406 and determines that the second value (e.g., "Orange") corresponds to a second subset of ontology classes of the ontology 130. For example, the category detector 612 determines that the second value (e.g., "Orange") corresponds to the first class (e.g., the "Fruit" class), the second class (e.g., the "Tree" class), and a third class (e.g., a "Citrus" class).

The category detector 612 determines whether each particular subset includes at least one common class. For example, the category detector 612, in response to determining that each of the first subset, the second subset, and the remaining subsets, includes the first class (e.g., the "Fruit" class), designates the entries of the particular column (e.g., the "Product" column) as corresponding to a category data type associated with the first class (e.g., the "Fruit" class). In a particular aspect, the category detector 612, in response to determining that each particular subset includes multiple common classes (e.g., the "Fruit" class and an "Edible" class), identify the class (e.g., the "Fruit" class) that is more closely related to the unique values (e.g., "Apple", "Orange", "Watermelon", "Mango", "Strawberry", "Grapes", and "Grapefruit"), as described with reference to FIG. 4, and designates the entries of the particular column (e.g., the "Product" column) as corresponding to a category datatype associated with the identified class (e.g., the "Fruit" class).

In a particular example, the category detector 612 identifies the particular category based on the disambiguation data 148 of FIG. 1. For example, the category detector 612 provides each of the unique values (e.g., "Apple", "Orange", "Watermelon", "Mango", "Strawberry", "Grapes", and "Grapefruit") as the input 157 of FIG. 1 to the data source 123. The category detector 612 receives the disambiguation data 148 from the data source 123. The category detector 612, in response to determining that the disambiguation data 148 indicates that each of the unique values (e.g., "Apple", "Orange", "Watermelon", "Mango", "Strawberry", "Grapes", and "Grapefruit") corresponds to a particular class (e.g., the "Fruit" class) designates the entries of the particular column (e.g., the "Product" column) as corresponding to the particular class. The category detector 612 may, in response to determining that the ontology 130 does not include the particular class (e.g., the "Fruit" class), add the particular class (e.g., the "Fruit" class) to the ontology 130 and include each of the unique values as an instance, a type, or both, of the particular class.

In a particular aspect, the category detector 612 identifies the particular class based on the disambiguation data 148 in response to determining that identification of the particular class based on the ontology 130 has been unsuccessful. For example, the category detector 612 may determine that identification of the particular class based on the ontology 130 has been unsuccessful in response to determining that the ontology 130 does not include a common class corresponding to each of the unique values or that the ontology 130 does not include a class corresponding to at least one of the entries of the particular column (e.g., the "Product" column).

In a particular aspect, the category detector 612 identifies based on the ontology 130, the data model 146, the disambiguation data 148, or a combination thereof. For example, the category detector 612 determines that a first subset (e.g., "Apple", "Orange", "Watermelon", and "Grapefruit") of the unique values corresponds to a particular class (e.g., the "Fruit" class) of the ontology 130. The category detector 612 provides each of the remaining subset (e.g., "Mango", "Strawberry", and "Grapes") of the unique values as the input 147 to the data model 146. The category detector 612 receives the output 149 from the data model 146 and determines that the output 149 indicates that each of a second subset (e.g., "Strawberry" and "Grapes") of the unique values also corresponds to the particular class (e.g., the "Fruit" class). The category detector 612 provides each of the remaining subset (e.g., "Mango") of the unique values as the input 157 to the data source 123. The category detector 612 receives the disambiguation data 148 from the data source 123 and determines that the disambiguation data 148 indicates that each of the remaining subset (e.g., "Mango") of the unique values also corresponds to the particular class (e.g., the "Fruit" class), designates the entries of the particular column (e.g., the "Product" column) as corresponding to a category datatype associated with the particular class.

The ontology class detector 110, in response to determining that the category detector 612 designated the entries of the particular column (e.g., the "Product" column) as corresponding to the category datatype associated with the particular class (e.g., the "Fruit" class), generates (or updates) annotation data 674 corresponding to the particular column to include entry annotation data indicating that the entries of the particular column correspond to the particular class.

In a particular aspect, the category detector 612 stores the disambiguation data 148 in the data source 122 or another data source. For example, the disambiguation data 148 includes information regarding the input 157 (e.g., "Strawberry") corresponding to an entry. The category detector 612 generates an identifier (e.g., a strawberry identifier (id.)) corresponding to the disambiguation data 148. The disambiguation data 148 is retrievable based on the identifier. For example, the identifier corresponds to a memory address of the disambiguation data 148. The ontology class detector 110 updates the annotation data 674 to include the identifier in entry annotation data of each entry of the particular column (e.g., the "Product" column) that includes a value corresponding to the input 157 (e.g., "Strawberry").

In a particular aspect, the category detector 612 determines that an entry of a particular column (e.g., the "First Name" column) corresponds to a type of a particular class of the ontology 130. For example, the category detector 612 determines that a particular entry (e.g., "Joe") of the particular column (e.g., the "First Name" column) corresponds to a first type (e.g., "Male") of a particular class (e.g., the "Person" class). To illustrate, the category detector 612 provides the particular entry (e.g., "Joe") as the input 157 to the data source 123 and receives the disambiguation data 148 from the data source 123. The category detector 612, in response to determining that the disambiguation data 148 indicates that the input 157 (e.g., "Joe") corresponds to the first type (e.g., "Male") of the particular class (e.g., the "Person" class), designates the particular entry as corresponding to the first type (e.g., "Male"), the particular class (e.g., the "Person" class), or both.

The ontology class detector 110, in response to determining that the category detector 612 has designated the particular entry (e.g., "Joe") of the particular column (e.g., the "First Name" column) as corresponding to the first type (e.g., "Male"), the particular class (e.g., the "Person" class), or both, updates (or generates) annotation data 672 of the particular column to include entry annotation data corresponding to the particular entry. The entry annotation data indicates that the particular entry (e.g., "Joe") corresponds to the first type (e.g., "Male"), the particular class (e.g., the "Person" class), or both.

The text detector 614 is configured to determine whether an entry of a particular column corresponds to a text data type. For example, the text detector 614 is configured to designate an entry of a particular column as corresponding to the text data type in response to determining that the entry has been processed by the other detectors (e.g., the reference/ID detector 204, the numeric data detector 206, the datetime detector 508, the currency detector 510, and the category detector 612) of the data type detector 112 and has not been successfully designated as corresponding to any data type. The text data type may correspond to a default data type. The ontology class detector 110 may, in response to determining that the text detector 614 has designated the entry as corresponding to the text data type, update annotation data of the particular column to include entry annotation data corresponding to the entry. The entry annotation data may indicate that the entry corresponds to a particular annotation class (e.g., a "Text" class) of the ontology 130 that is associated with the text data type. The annotation data 160 includes the annotation data 260, the annotation data 262, the annotation data 264 of FIG. 2, the annotation data 566, the annotation data 568, the annotation data 570 of FIG. 5, the annotation data 672, the annotation data 674, or a combination thereof.

Generating the annotation data 160 based on the disambiguation data 148 enables the computing device 102 to reduce an amount of memory used at the data source 122. For example, the computing device 102 retrieves the portion (e.g., the disambiguation data 148) of the data that is relevant to the data table 140 from the data source 123 without storing, at the data source 122, all data that could possibly be relevant to the data table 140. The computing device 102 thus takes advantage of the memory resources of the data source 123, which may be remote from the computing device 102 and the data source 122, and which may correspond to multiple data sources (e.g., a news source, a search engine, etc.).

Generating the annotation data 160 based on the disambiguation data 148 also enables the computing device 102 to take advantage of processing resources of the data source 123 and reduce the amount of processing at the computing device 102. For example, processing resources of the data source 123 are used to identify the disambiguation data 148 corresponding to the input 157. The computing device 102 provides the input 157 to the data source 123 and receives the disambiguation data 148, without performing data analysis on a larger set of data to identify the disambiguation data 148 corresponding to the input 157.

Generating the annotation data 160 based on the data model 146 enables the computing device 102 to reduce resource utilization (e.g., memory, processing cycles, and/or time) at the data source 122. For example, the data model 146 uses the wordvecs 420 of FIG. 4 to represent syntactic and semantic relations between words. The wordvecs 420 provide a compact representation of the relationships between a particular word and other words, less memory may be used to store the wordvecs 420 than other representations of syntactic and semantic relations between words. Analyzing the wordvecs 420 may be more efficient. For example, relative closeness of one word to another may be determined based on performing a vector difference. Performing a vector difference may be more efficient than analyzing other representations of relations between words to determine relative closeness of one word to another.

Figure 7:
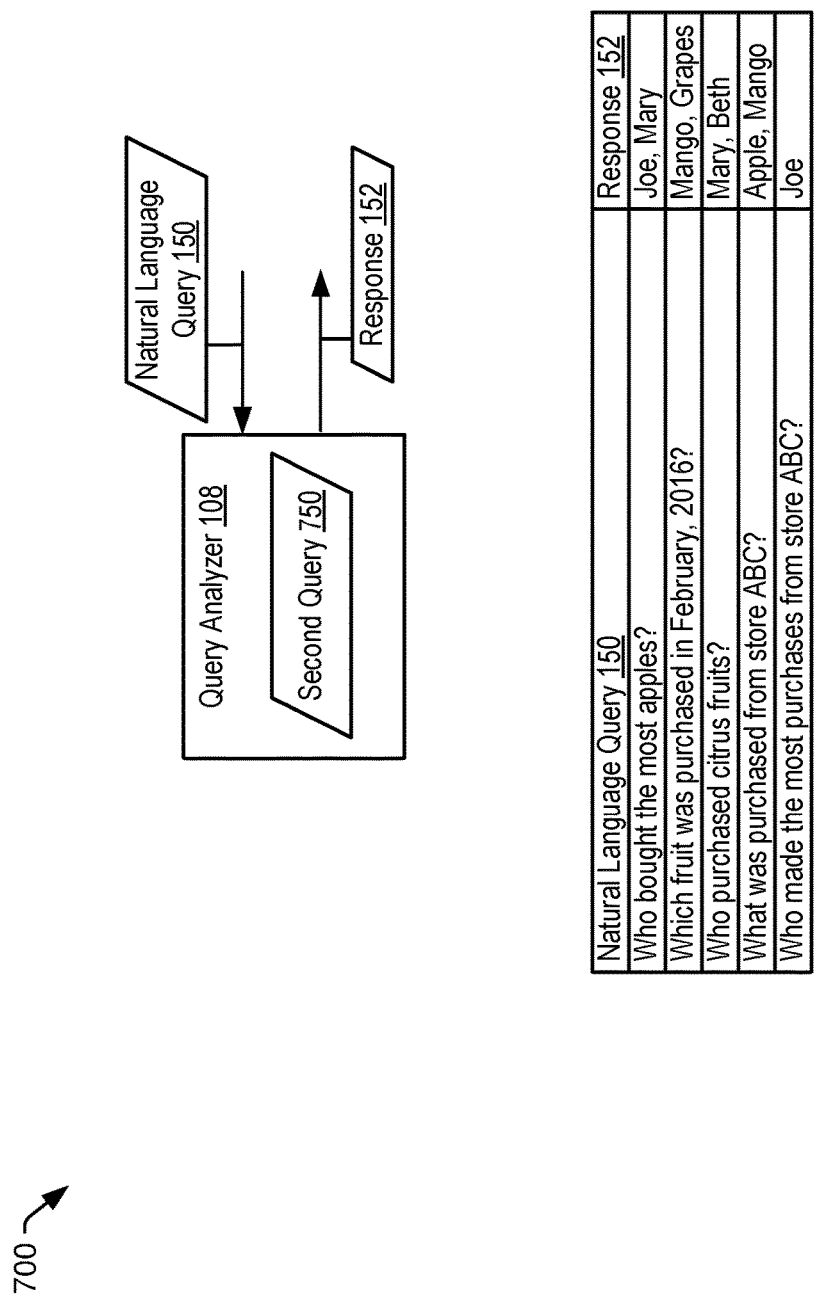
FIG. 7 illustrates an example of generating responses to natural language queries based on annotation data.
Figure 8:
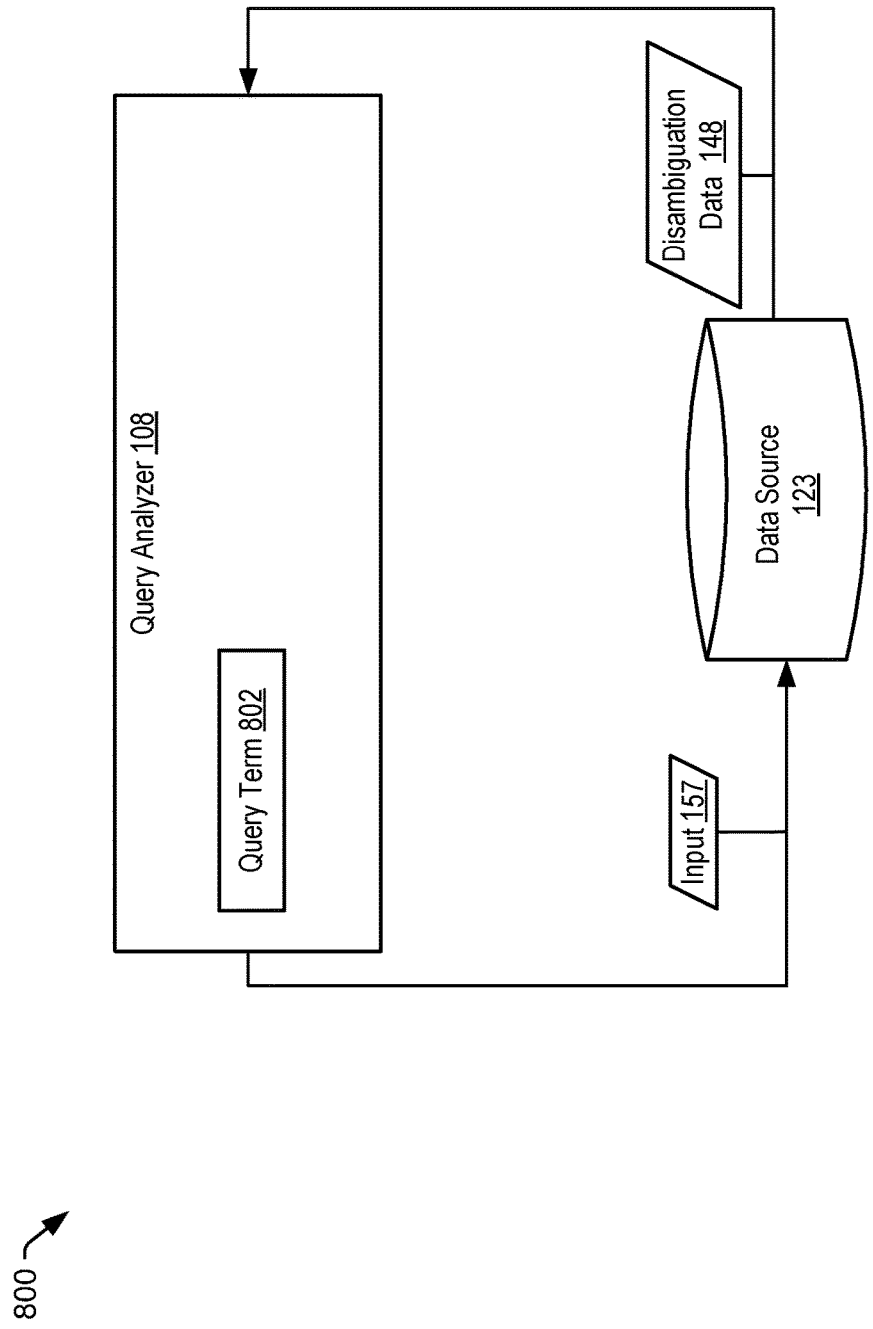
FIG. 8 illustrates an example of generating responses to natural language queries based on disambiguation data.
Figure 9:
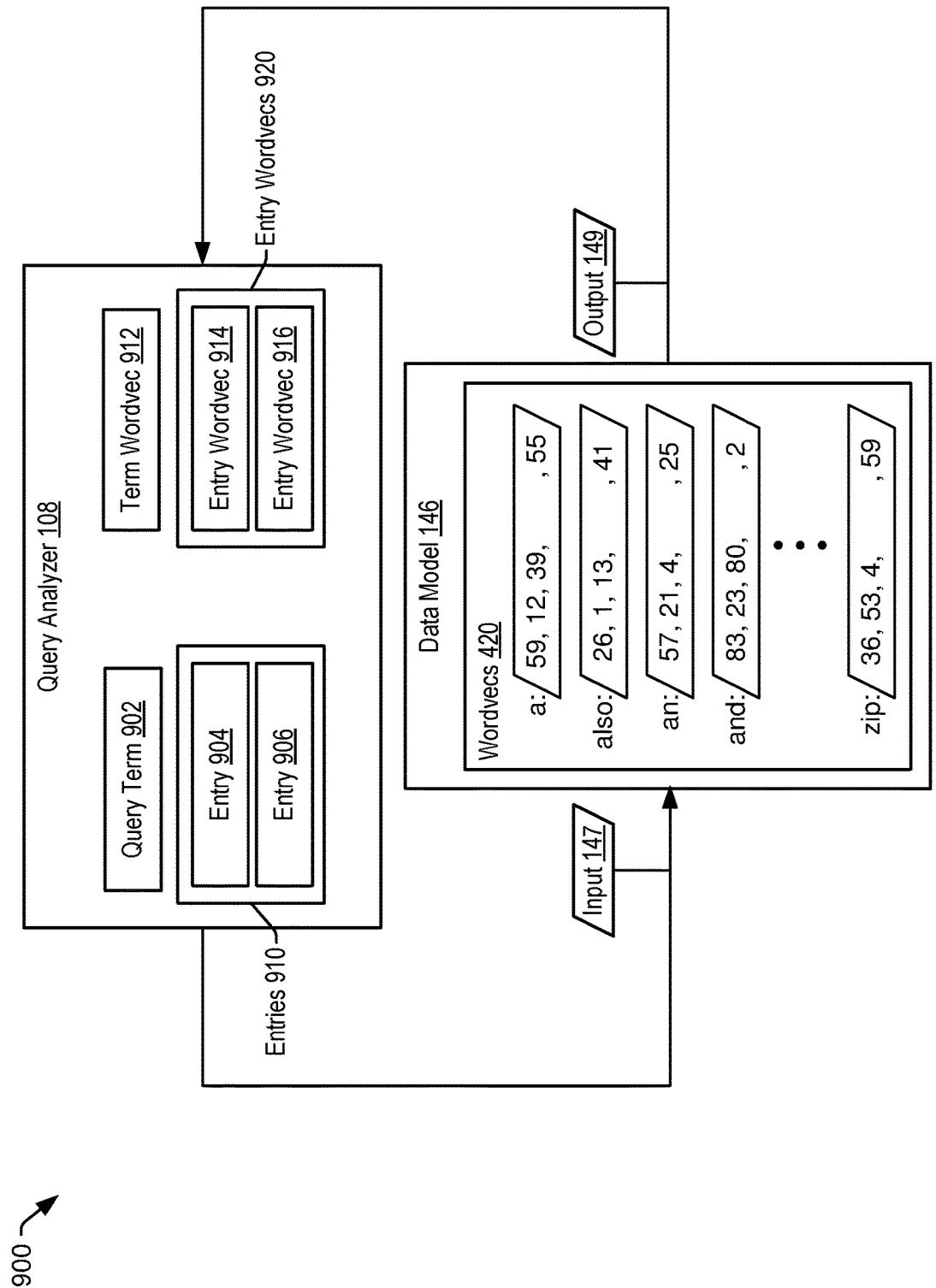
FIG. 9 illustrates an example of generating responses to natural language queries based on a data model.
Figure 10:
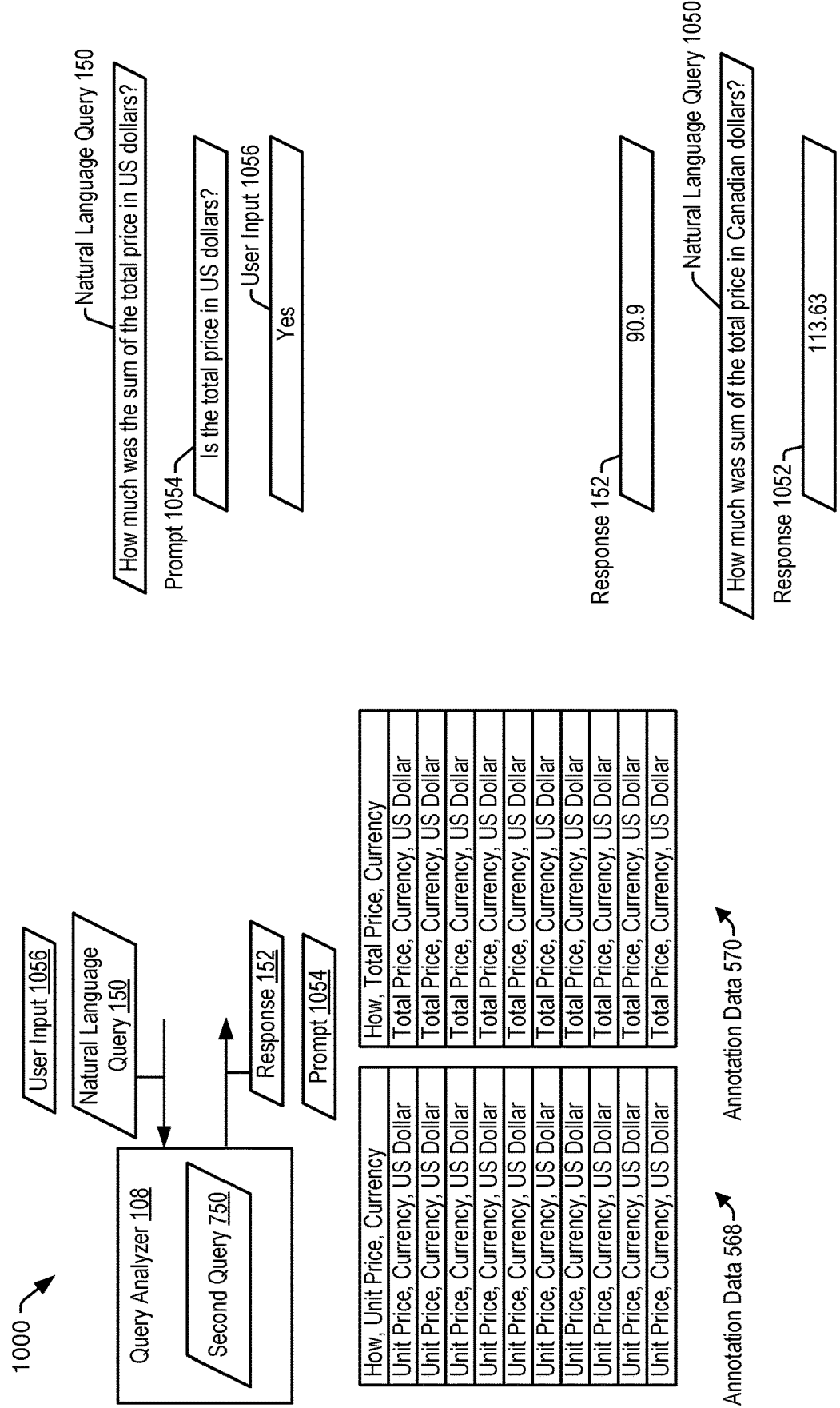
FIG. 10 illustrates a particular example of updating annotation data based on user input.

FIGS. 7-10 illustrate examples of generating responses to natural language queries. FIG. 7 illustrates an example of generating responses to natural language queries based on the annotation data 160, the disambiguation data 148, the data model 146 of FIG. 1, or a combination thereof. FIG. 8 illustrates an example of receiving the disambiguation data 148 corresponding to a query term of a natural language query. FIG. 9 illustrates an example of identifying one or more column entries corresponding to a query term of a natural language query. FIG. 10 illustrates an example of updating the annotation data 160 based on user input and generating a response to a natural language query based on the updated version of the annotation data 160.

FIG. 7 illustrates an example 700 of generating responses to natural language queries. The query analyzer 108 generates the response 152 in response to receiving the natural language query 150. For example, the query analyzer 108 generates, based on the annotation data 160, the disambiguation data 148, the data model 146, or a combination thereof, a second query 750 corresponding to the natural language query 150.

In an illustrative example, the natural language query 150 corresponds to "Who bought the most apples?" The query analyzer 108 performs sentence structure analysis of the natural language query 150 to identify query terms corresponding to various sentence components. For example, the query analyzer 108 uses various sentence analysis techniques to determine that a subject term (e.g., "Who") corresponds to a subject of the natural language query 150 and that predicate terms (e.g., "bought the most apples?") correspond to a predicate of the natural language query 150. The query analyzer 108 may determine that the predicate terms include a predicate verb term (e.g., "bought") and second predicate terms (e.g., "the most apples").

The query analyzer 108 determines whether the subject term (e.g., "Who") matches any columns of the data table 140 based on column headers of the data table 140 indicated by the table metadata 144, column annotation data indicated by the annotation data 160, the disambiguation data 148, the data model 146, or a combination thereof. For example, the query analyzer 108, in response to determining that the subject term (e.g., "Who") does not match any column headers of the data table 140, performs a comparison of the subject term and column annotation data indicated by the annotation data 160. For example, the query analyzer 108 determines that the subject term (e.g., "Who") matches the first column 142 (e.g., the "First Name" column) in response to determining that the subject term matches the column annotation data 162 (e.g., "Who" AND "Person") of the first column 142. The query analyzer 108, in response to determining that the subject term (e.g., "Who") matches the first column 142 (e.g., the "First Name" column), generates a first version (e.g., a partial version) of the second query 750 (e.g., "SELECT First Name FROM Table") to select one or more entries from the first column 142.

The query analyzer 108 updates the second query 750 based on an analysis of the predicate terms (e.g., "bought the most apples?"). For example, the query analyzer 108 determines whether the predicate verb term (e.g., "bought") matches any columns of the data table 140 based on column headers of the data table 140 indicated by the table metadata 144, column annotation data indicated by the annotation data 160, the disambiguation data 148, the data model 146, entry values of the data table 140, or a combination thereof. For example, the query analyzer 108, in response to determining that the predicate verb term (e.g., "bought") does not match any of the column headers of the data table 140 and does not match any column annotation data indicated by the annotation data 160, generates one or more first related terms corresponding to the predicate verb term (e.g., "bought") based on the disambiguation data 148. For example, the query analyzer 108 provides the predicate verb term (e.g., "bought") to the data source 123 as the input 157 and receives the disambiguation data 148 from the data source 123, as further described in reference to FIG. 8. The query analyzer 108 determines that the disambiguation data 148 indicates that the predicate verb term (e.g., "bought") corresponds to one or more related terms (e.g., "purchased", "acquired", and "paid for"). The query analyzer 108 determines that the predicate verb term (e.g., "bought") matches a first column (e.g., the "Quantity Purchased" column) of the data table 140 and a second column (e.g., the "Date of Purchase" column) in response to determining that at least one of the related term(s) (e.g., "purchased") matches a first column header (e.g., "Quantity Purchased") of the first column and a second column header (e.g., "Date of Purchase") of the second column.

In a particular aspect, the query analyzer 108, in response to determining that the predicate verb term (e.g., "bought") does not match any of the column headers of the data table 140 and does not match any column annotation data indicated by the annotation data 160, determines whether the predicate verb term (e.g., "bought") matches any columns of the data table 140 based on the data model 146. For example, the query analyzer 108 provides the predicate verb term (e.g., "bought") to the data model 146 and receives the output 149 from the data model 146, as further described with reference to FIG. 9. The output 149 indicates a term wordvec corresponding to the predicate verb term (e.g., "bought"). The query analyzer 108 provides each of the column headers of the data table 140 to the data model 146 and receives the corresponding column wordvec from the data table 140.

The query analyzer 108 determines similarity metrics based on a comparison of the term wordvec and each of the column wordvecs. For example, the query analyzer 108 determines a first similarity metric based on a comparison of the term wordvec corresponding to the predicate verb term (e.g., "bought") and a first column wordvec corresponding to a first column header (e.g., "First Name"). The query analyzer 108 determines a second similarity metric based on a comparison of the term wordvec, a second column wordvec corresponding to a second column header (e.g., "Quantity Purchased"), and a third column wordvec corresponding to a third column header (e.g., "Date of Purchase").

The query analyzer 108 determines that the predicate verb term (e.g., "bought") matches one or more columns of the data table 140 in response to determining that the corresponding similarity metrics satisfy a comparison threshold. For example, the query analyzer 108 determines that the predicate verb term (e.g., "bought") matches a first column (e.g., the "Quantity Purchased" column) in response to determining that the second similarity metric corresponding to the second column header (e.g., "Quantity Purchased") of the particular column satisfies a comparison threshold. Similarly, the query analyzer 108 determines that the predicate verb term (e.g., "bought") matches a second column (e.g., the "Date of Purchase" column) in response to determining that the third similarity metric corresponding to the second column satisfies the comparison threshold.

The query analyzer 108 determines that the second predicate terms (e.g., "the most apples") include a function term (e.g., "most") that corresponds to a particular database function (e.g., "max"). For example, the query analyzer 108 maintains function mapping data indicating a mapping between terms and corresponding database functions. To illustrate, the function mapping data indicates that one or more first terms (e.g., "most", "maximum", or "highest") map to a first database function (e.g., "max"), that one or more second terms (e.g., "least", "minimum", or "lowest") map to a second database function (e.g., "min"), and so on. The query analyzer 108 determines that the function mapping data indicates that the function term (e.g., "most") of the second predicate terms (e.g., "the most apples") corresponds to the particular function (e.g., "max").

The query analyzer 108 determines that the particular function (e.g., "max") is associated with a particular datatype (e.g., a numeric data type). The query analyzer 108 determines that the first column (e.g., the "Quantity Purchased" column) is associated with a first data type (e.g., an integer data type). The query analyzer 108 determines that the second column (e.g., the "Date of Purchase" column) is associated with a second data type (e.g., a date data type). The query analyzer 108, in response to determining that the first data type (e.g., an integer data type) corresponds to the particular data type (e.g., a numeric data type), adds the first column (e.g., the "Quantity Purchased" column) to a set of possible arguments for the particular function (e.g., "max").

The query analyzer 108, in response to determining that the second predicate terms (e.g., "the most apples") includes an entry term (e.g., "apples"), determines whether the entry term matches any columns or entries of the data table 140. For example, the query analyzer 108 determines whether the entry term (e.g., "apples") matches any columns of the data table 140 based on column headers of the data table 140 indicated by the table metadata 144, column annotation data indicated by the annotation data 160, the disambiguation data 148, the data model 146, entry values of the data table 140, or a combination thereof. The query analyzer 108 determines that the entry term (e.g., "apples") corresponds to an entry value (e.g., "Apple") of a subset of entries of a particular column (e.g., the "Product" column). The query analyzer 108, in response to determining that the particular data type (e.g., a numeric datatype) of the particular function (e.g., "max") does not match a data type (e.g., a text datatype) of the particular column (e.g., the "Product" column), refrains from including the particular column in the set of possible arguments for the particular function.

The query analyzer 108 generates a third version (e.g., a partial version) of the second query 750 (e.g., "SELECT First Name FROM Data Table, WHERE Product='Apple' AND Quantity Purchased=") to select entries corresponding to particular column (e.g., the "Product" column) having the entry value (e.g., "Apple"). The query analyzer 108, in response to determining that none of the second predicate terms (e.g., "the most apples") remain unmatched and that the set of possible arguments of the particular function includes a single column (e.g., the "Quantity Purchased" column), generates a fourth version of the second query 750 (e.g., "SELECT First Name FROM Data Table, WHERE Product='Apple' AND Quantity Purchased=(SELECT max (Quantity Purchased) FROM Data Table AS f WHERE f.Product=Data Table.Product)") to apply the particular function to the first column (e.g., the "Quantity Purchased" column) of the entries selected based on the particular column (e.g., the "Product" column) having the entry value (e.g., "Apple").

The query analyzer 108 generates the second query 750 (e.g., "SELECT First Name FROM Data Table, WHERE Product='Apple' AND Quantity Purchased=(SELECT max (Quantity Purchased) FROM Data Table AS f WHERE f.Product=Data Table.Product)") corresponding to the natural language query 150 (e.g., "Who bought the most apples?"). The query analyzer 108 generates the response 152 (e.g., "Joe, Mary") to the second query 750 by executing the second query 750 against a database instance that includes the data table 140. The query analyzer 108 outputs the response 152 (e.g., "Joe, Mary") as a response to the natural language query 150.

In an illustrative example, the natural language query 150 corresponds to "Which fruit was purchased in February, 2016?" The query analyzer 108 performs sentence structure analysis to determine that a subject term (e.g., "Which fruit") corresponds to a subject of the natural language query 150 and that predicate terms (e.g., "was purchased in February, 2016?") corresponds to a predicate of the natural language query 150. The query analyzer 108 may determine that the predicate terms include a predicate verb term (e.g., "purchased") and second predicate terms (e.g., "in February, 2016").

The query analyzer 108 determines whether the subject term (e.g., "Which fruit") matches any columns of the data table 140 based on column headers of the data table 140 indicated by the table metadata 144, column annotation data indicated by the annotation data 160, the disambiguation data 148, the data model 146, or a combination thereof. For example, the query analyzer 108, in response to determining that the subject term (e.g., "Which fruit") matches a particular column (e.g., the "Product" column) in response to determining that the subject term matches the column annotation data 162 (e.g., "Which", "What" AND "Fruit") of the particular column. The query analyzer 108, in response to determining that the subject term (e.g., "Which fruit") matches the particular column (e.g., the "Product" column), generates a first version (e.g., a partial version) of the second query 750 (e.g., "SELECT Product FROM Data Table") to select one or more entries from the particular column.

The query analyzer 108 updates the second query 750 based on an analysis of the predicate terms (e.g., "was purchased in February, 2016?"). For example, the query analyzer 108 determines whether the predicate verb term (e.g., "purchased") matches any columns of the data table 140 based on column headers of the data table 140 indicated by the table metadata 144, column annotation data indicated by the annotation data 160, the disambiguation data 148, the data model 146, entry values of the data table 140, or a combination thereof. To illustrate, the query analyzer 108 determines that the predicate verb term (e.g., "purchased") matches a first column (e.g., the "Quantity Purchased" column) and a second column (e.g., the "Date of Purchase" column) of the data table 140 in response to determining that the predicate verb term matches a first column header (e.g., "Quantity Purchased") of the first column and a second column header (e.g., "Date of Purchase") of the second column.

The query analyzer 108 may use various sentence analysis techniques to determine that the second predicate terms (e.g., "in February, 2016") correspond to a prepositional phrase. The query analyzer 108 may select one or more entries of a column based on the prepositional phrase (e.g., "in February, 2016"). For example, the query analyzer 108 determines that the second predicate terms (e.g., "in February, 2016") corresponds to a date value. To illustrate, the query analyzer 108, in response to determining that date terms (e.g., "February, 2016") of the second predicate terms (e.g., "in February, 2016") satisfy a regular expression, determines that the data terms correspond to a date value (e.g., YEAR=2016 and MONTH=2) indicating a particular date range. The query analyzer 108, in response to determining that the first column does not correspond to a date data type, that the second column (e.g., the "Date of Purchase" column) corresponds to a date data type, or both, generates a third version of the second query 750 (e.g., "SELECT Product FROM Data Table, WHERE YEAR (Date of Purchase)=2016 AND MONTH (Date of Purchase) =2") to select entries corresponding to entry values of the second column (e.g., the Date of Purchase" column) satisfying the date value (e.g., YEAR=2016 and MONTH=2).

The query analyzer 108 generates the second query 750 (e.g., "SELECT Product FROM Data Table, WHERE YEAR (Date of Purchase)=2016 AND MONTH (Date of Purchase)=2") corresponding to the natural language query 150 (e.g., "Which fruit was purchased in February, 2016?"). The query analyzer 108 generates the response 152 (e.g., "Mango, Grapes") to the second query 750 by executing the second query 750 against a database instance that includes the data table 140. The query analyzer 108 outputs the response 152 (e.g., "Mango, Grapes") as a response to the natural language query 150.

In an illustrative example, the natural language query 150 corresponds to "Who purchased citrus fruits?" The query analyzer 108 performs sentence structure analysis to determine that a subject term (e.g., "Who") corresponds to a subject of the natural language query 150 and that predicate terms (e.g., "purchased citrus fruits?") corresponds to a predicate of the natural language query 150. The query analyzer 108 may determine that the predicate terms include a predicate verb term (e.g., "purchased") and second predicate terms (e.g., "citrus fruits").

The query analyzer 108 determines whether the subject term (e.g., "Who") matches any columns of the data table 140 based on column headers of the data table 140 indicated by the table metadata 144, column annotation data indicated by the annotation data 160, the disambiguation data 148, the data model 146, or a combination thereof. For example, the query analyzer 108, in response to determining that the subject term (e.g., "Who") matches the first column 142 (e.g., the "First Name" column) in response to determining that the subject term matches the column annotation data 162 (e.g., "Who" AND "Person") of the first column 142. The query analyzer 108, in response to determining that the subject term (e.g., "Who") matches the first column 142 (e.g., the "First Name" column), generates a first version (e.g., a partial version) of the second query 750 (e.g., "SELECT First Name FROM Data Table") to select one or more entries from the first column 142.

The query analyzer 108 updates the second query 750 based on an analysis of the predicate terms (e.g., "purchased citrus fruit?"). For example, the query analyzer 108 determines that the predicate verb term (e.g., "purchased") matches a first column (e.g., the "Quantity Purchased" column) and a second column (e.g., the "Date of Purchase" column) of the data table 140.

The query analyzer 108 determines that a column term of the second predicate terms (e.g., "fruit") matches a third particular column (e.g., the "Product" column) of the data table 140. The query analyzer 108 determines, based on sentence analysis techniques, that a modifier term (e.g., "citrus") of the second predicate terms (e.g., "fruit") appears to modify the column term. The query analyzer 108 determines whether the modifier term (e.g., "citrus") corresponds to one or more of the first column (e.g., the "Quantity Purchased" column), the second column (e.g., the "Date of Purchase" column), or the third particular column (e.g., the "Product" column) For example, the query analyzer 108 determines whether the modifier term (e.g., "citrus") corresponds to a particular entry value of a particular column of the data table 140 based on the particular entry value, the annotation data 160, the disambiguation data 148, the data model 146, or a combination thereof.

In a particular implementation, the query analyzer 108 determines that the annotation data 674 associated with the third particular column (e.g., the "Product" column) indicates that a first identifier (e.g., an Orange id.) is associated with a first entry value (e.g., "Orange") of a first entry of the third particular column. The query analyzer 108 retrieves the disambiguation data 148 based on the first identifier (e.g., the Orange id.). The query analyzer 108 determines that the modifier term (e.g., "citrus") corresponds to the first entry value (e.g., "Orange") in response to determining that the disambiguation data 148 indicates that the first entry value (e.g., "Orange") corresponds to the modifier term (e.g., "citrus"). Similarly, the query analyzer 108 may determine that the modifier term (e.g., "citrus") corresponds to a second entry value (e.g., "Grapefruit") of the third particular column (e.g., the "Product" column).

The query analyzer 108, in response to determining that the modifier term (e.g., "citrus") corresponds to one or more entry values (e.g., "Orange" and "Grapefruit") of the third particular column (e.g., the "Product" column), generates a third version of the second query 750 (e.g., "SELECT First Name FROM Data Table, WHERE Product='Orange' OR Product='Grapefruit'") to select entries corresponding to entries of the third particular column (e.g., the "Product" column) having the one or more entry values.

In an alternate aspect, the annotation data 674 does not include the first identifier (e.g., the orange id.) associated with first disambiguation data (e.g., the disambiguation data 148) indicating that the first entry value (e.g., "Orange") corresponds to the modifier term (e.g., "citrus") and does not include a second identifier (e.g., a grapefruit id.) associated with second disambiguation data (e.g., the disambiguation data 148) indicating that the second entry value (e.g., "Grapefruit") corresponds to the modifier term. The query analyzer 108 determines that no match is detected between the modifier term (e.g., "citrus") and any columns (e.g., the first column, the second column, or the third particular column) of the data table 140. For example, the query analyzer 108 determines that no match is detected between the modifier term (e.g., "citrus") and the third particular column (e.g., the "Product" column) in response to determining that no match is detected between the modifier term and a column header of the third particular column and that no match is detected between the modifier term and an entry value of an entry of the third particular column. The query analyzer 108 determines that no match is detected between the modifier term (e.g., "citrus") and the annotation data 674 corresponding to the third particular column (e.g., the "Product" column).

The query analyzer 108, in response to determining that no match is detected between the modifier term (e.g., "citrus") and the third particular column (e.g., the "Product" column) and that no match is detected between the modifier term and the annotation data 674 corresponding to the third particular column, identifies one or more terms corresponding to the modifier term (e.g., "citrus") based on the disambiguation data 148, the data model 146, or both. For example, the query analyzer 108 determines the one or more terms based on the disambiguation data 148. For example, the query analyzer 108, in response to determining that no match is detected between the modifier term (e.g., "citrus") and the third particular column (e.g., the "Product" column) and that no match is detected between the modifier term and the annotation data 674 corresponding to the third particular column, provides the modifier term as the input 157 to the data source 123 and receives the disambiguation data 148 from the data source 123. The disambiguation data 148 indicates that one or more terms (e.g., "Orange", "Fruit", "Product", "Grapefruit", and "Flavor") correspond to the modifier term (e.g., "citrus").

In a particular implementation, the query analyzer 108 determines the one or more terms based on the data model 146. For example, the query analyzer 108 provides the modifier term as the input 147 to the data model 146 (e.g., a trained data model). The query analyzer 108 receives the output 149 from the data model 146. The output 149 includes a term wordvec associated with the modifier term (e.g., "citrus"). The query analyzer 108 generates similarity metrics by comparing the term wordvec to other wordvecs of the wordvecs 420 of the data model 146. For example, the query analyzer 108 generates a first similarity metric based on a comparison (e.g., a vector difference) of the term wordvec with a first wordvec of the wordvecs 420, a second similarity metric based on a comparison of the term wordvec with a second wordvec of the wordvecs 420, one or more additional similarity metrics, or a combination thereof. The first wordvec corresponds to a first term (e.g., "Orange") and the second wordvec corresponds to a second term (e.g., "Vehicle").

The query analyzer 108 identifies a first subset of the similarity metrics based on a first comparison threshold. For example, the query analyzer 108 determines that the first subset includes the first similarity metric in response to determining that the first similarity metric satisfies the first comparison threshold. As another example, the query analyzer 108 determines that the second similarity metric is not to be included in the first subset in response to determining that the second similarity metric fails to satisfy the first comparison threshold.

The query analyzer 108 determines that the first subset corresponds to one or more terms (e.g., "Orange", "Fruit", "Product", "Grapefruit", and "Flavor") that appear to be related to the modifier term (e.g., "citrus"). For example, the query analyzer 108 determines that the first term (e.g., "Orange") appears to be related to the modifier term (e.g., "citrus") in response to determining that the first subset includes the first similarity metric. The first subset may include similarity metrics corresponding to a third term (e.g., "Fruit"), a fourth term (e.g., "Product"), a fifth term (e.g., "Grapefruit"), a sixth term (e.g., "Flavor"), or a combination thereof. The query analyzer 108 determines that the one or more terms correspond to the modifier term (e.g., "citrus").

In a particular implementation, the query analyzer 108 identifies the one or more terms (e.g., "Orange", "Fruit", "Product", "Grapefruit", and "Flavor") corresponding to the modifier term (e.g., "citrus") based on the disambiguation data 148 and the data model 146. For example, the query analyzer 108 identifies a first subset of the one or more terms based on the disambiguation data 148 and a second subset of the one or more terms based on the data model 146.

The query analyzer 108 determines whether the terms (e.g., "Orange", "Fruit", "Product", "Grapefruit", and "Flavor") corresponding to the modifier term (e.g., "citrus") match the annotation data 160, one or more columns of the data table 140, or a combination thereof. For example, the query analyzer 108 determines that a particular term of the terms (e.g., "Orange", "Fruit", "Product", "Grapefruit", and "Flavor") matches a particular column of the data table 140 in response to determining that the particular term matches a column header of the particular column, at least one entry value of the particular column, or both. To illustrate, the query analyzer 108, in response to determining that the terms (e.g., "Orange", "Fruit", "Product", "Grapefruit", and "Flavor") include the first term (e.g., "Orange") and that the first term matches a first entry value (e.g., "Orange") of the third particular column (e.g., the "Product" column), determines that the first term matches the third particular column and that the modifier term (e.g., "citrus") corresponds to the first entry value (e.g., "Orange") of the third particular column. Similarly, the query analyzer 108 determines that the fifth term (e.g., "Grapefruit") matches a second entry value (e.g., "Grapefruit") of the third particular column (e.g., the "Product" column) and that the modifier term (e.g., "citrus") correspond to the second entry value (e.g., "Grapefruit").

In a particular implementation, the query analyzer 108, in response to determining that the terms (e.g., "Orange", "Fruit", "Product", "Grapefruit", and "Flavor") include the fourth term (e.g., "Product") and that the fourth term matches a column header (e.g., "Product") of the third particular column (e.g., the "Product" column), determines that the fourth term matches the third particular column and that the modifier term (e.g., "citrus") corresponds to the third particular column.

The query analyzer 108 determines that a particular term of the terms (e.g., "Orange", "Fruit", "Product", "Grapefruit", and "Flavor") matches the annotation data 160 in response to determining that the particular term matches column annotation data of the annotation data 160, entry annotation data of the annotation data 160, or both. For example, the query analyzer 108, in response to determining that terms (e.g., "Orange", "Fruit", "Product", "Grapefruit", and "Flavor") include the third term (e.g., "Fruit") and that the third term matches column annotation data of the annotation data 674 (e.g., "Which", "What", and "Fruit") associated with the third particular column (e.g., the "Product" column), determines that the third term (e.g., "Fruit") matches the annotation data 160 and that the modifier term (e.g., "citrus") corresponds to the third particular column (e.g., the "Product" column).

In a particular implementation, the query analyzer 108, in response to determining that terms includes the third term (e.g., "Fruit") and the third term matches entry annotation data (e.g., "Fruit" and an identifier) of the annotation data 674 associated with a particular entry of the third particular column (e.g., the "Product" column), determines that the third term (e.g., "Fruit") matches the annotation data 160 and that the modifier term (e.g., "citrus") corresponds to the particular entry of the third particular column.

The query analyzer 108, in response to determining that at least one of the terms (e.g., "Orange", "Fruit", "Product", "Grapefruit", and "Flavor") matches the annotation data 160, one or more columns of the data table 140, or a combination thereof, generates the third version of the second query 750. For example, the query analyzer 108, in response to determining that the modifier term (e.g., "citrus") corresponds to one or more entry values of the third particular column (e.g., the "Product" column), generates the third version of the second query 750 (e.g., "SELECT First Name FROM Data Table, WHERE Product='Orange' OR Product='Grapefruit'") to select entries corresponding to the third particular column (e.g., the "Product" column) having the one or more entry values.

The query analyzer 108 generates the second query 750 (e.g., "SELECT First Name FROM Data Table, WHERE Product='Orange' OR Product='Grapefruit'") corresponding to the natural language query 150 (e.g., "Who purchased citrus fruits?"). The query analyzer 108 generates the response 152 (e.g., "Mary, Beth") to the second query 750 by executing the second query 750 against a database instance that includes the data table 140. The query analyzer 108 outputs the response 152 (e.g., "Mary, Beth") as a response to the natural language query 150.

In an illustrative example, the natural language query 150 corresponds to "What was purchased from store ABC?" The query analyzer 108 performs sentence structure analysis to determine that a subject term (e.g., "What") corresponds to a subject of the natural language query 150 and that predicate terms (e.g., "was purchased from store ABC?") corresponds to a predicate of the natural language query 150. The query analyzer 108 may determine that the predicate terms include a predicate verb term (e.g., "purchased") and second predicate terms (e.g., "from store ABC").

The query analyzer 108 determines whether the subject term (e.g., "What") matches any columns of the data table 140 based on column headers of the data table 140 indicated by the table metadata 144, column annotation data indicated by the annotation data 160, the disambiguation data 148, the data model 146, or a combination thereof. For example, the query analyzer 108, in response to determining that the subject term (e.g., "What") matches a particular column (e.g., the "Product" column) in response to determining that the subject term matches column annotation data (e.g., "Which", "What" AND "Fruit") of the particular column. The query analyzer 108, in response to determining that the subject term (e.g., "What") matches the particular column (e.g., the "Product" column), generates a first version (e.g., a partial version) of the second query 750 (e.g., "SELECT Product FROM Data Table") to select one or more entries from the particular column.

The query analyzer 108 updates the second query 750 based on an analysis of the predicate terms (e.g., "was purchased from store ABC?"). For example, the query analyzer 108 determines that the predicate verb term (e.g., "purchased") matches a first column (e.g., the "Quantity Purchased" column) and a second column (e.g., the "Date of Purchase" column) of the data table 140.

The query analyzer 108 uses various sentence analysis techniques to determine that the second predicate terms (e.g., "from the store ABC") correspond to a prepositional phrase. The query analyzer 108 updates the second query 750 based on the prepositional phrase (e.g., "from the store ABC"). For example, the query analyzer 108 determines that a foreign term (e.g., "store ABC") of the second predicate terms (e.g., "from the store ABC") does not appear to match any columns or entry values of the data table 140. The query analyzer 108, in response to determining that the table metadata 144 indicates that a third particular column (e.g., the "StoreID" column) of the data table 140 corresponds to a REF field type (e.g., a foreign key) of a second data table, determines whether the foreign term (e.g., "store ABC") matches an entry of the second data table. The query analyzer 108 determines that the second data table indicates that the foreign term (e.g., "store ABC") is associated with a particular id (e.g., "0021") and that the third particular column (e.g., the "StoreID" column) includes the particular id as an entry value.

The query analyzer 108, in response to determining that the foreign term corresponds to the third particular column (e.g., the "Store ID" column), generates a second version of the second query 750 (e.g., "SELECT Product FROM Data Table, WHERE StoreID=0021") to select entries corresponding to entries of the third particular column (e.g., the "StoreID" column) having the particular entry value (e.g., "0021").

The query analyzer 108 generates the second query 750 (e.g., "SELECT Product FROM Data Table, WHERE StoreID=0021") corresponding to the natural language query 150 (e.g., "What was purchased from store ABC?"). The query analyzer 108 generates the response 152 (e.g., "Apple, Mango") to the second query 750 by executing the second query 750 against a database instance that includes the data table 140. The query analyzer 108 outputs the response 152 (e.g., "Apple, Mango") as a response to the natural language query 150.

In an illustrative example, the natural language query 150 corresponds to "Who made the most purchases from store ABC?" The query analyzer 108 performs sentence structure analysis to determine that a subject term (e.g., "Who") corresponds to a subject of the natural language query 150 and that predicate terms (e.g., "made the most purchases from store ABC?") corresponds to a predicate of the natural language query 150. The query analyzer 108 may determine that the predicate terms include second predicate terms (e.g., "made the most purchases") and third predicate terms (e.g., "from store ABC").

The query analyzer 108 determines that the subject term (e.g., "Who") matches the first column 142 (e.g., the "First Name" column) in response to determining that the subject term matches column annotation data 162 (e.g., "Who" AND "Person"). The query analyzer 108, in response to determining that the subject term (e.g., "Who") matches the first column 142 (e.g., the "First Name" column), generates a first version (e.g., a partial version) of the second query 750 (e.g., "SELECT First Name FROM Data Table") to select one or more entries from the first column 142.

The query analyzer 108 updates the second query 750 based on an analysis of the predicate terms (e.g., "made the most purchases from store ABC?"). For example, the query analyzer 108 uses various sentence analysis techniques to determine that the third predicate terms (e.g., "from the store ABC") correspond to a prepositional phrase. The query analyzer 108 updates the second query 750 based on the prepositional phrase (e.g., "from the store ABC"). For example, the query analyzer 108 determines that a foreign term (e.g., "store ABC") of the second predicate terms (e.g., "from the store ABC") matches an entry of a second data table and that an entry value of a third particular column (e.g., the "StoreID" column) indicates an id. (e.g., "0021") of the entry of the second data table.

The query analyzer 108, in response to determining that the foreign term corresponds to the third particular column (e.g., the "Store ID" column), generates a second version (e.g., a partial version) of the second query 750 (e.g., "SELECT First Name FROM Data Table WHERE StoreID=0021") to select entries corresponding to the third particular column (e.g., the "StoreID" column) having the particular entry value (e.g., "0021").

The query analyzer 108 selects a particular function based on the second predicate terms (e.g., "made the most purchases"). For example, the query analyzer 108 determines that the second predicate terms (e.g., "made the most purchases") include a first predicate term (e.g., "purchases") that matches a first column (e.g., the "Quantity Purchased" column) and a second column (e.g., the "Date of Purchase" column) of the data table 140. The query analyzer 108 selects a particular function (e.g., a max function) in response to determining that the second predicate terms (e.g., "made the most purchases") includes a predicate (e.g., "most") and that function mapping data indicates that the predicate corresponds to the particular function.

The query analyzer 108 selects the first column (e.g., the "Quantity Purchased" column) as an argument for the particular function (e.g., the max function) in response to determining that the particular function corresponds to a particular datatype (e.g., a numeric data type) that matches a first data type (e.g., an integer datatype) of the first column and that does not match a second data type (e.g., a date datatype) of the second column (e.g., the "Date of Purchase" column).

In a particular aspect, the query analyzer 108 generates a third version of the second query 750 (e.g., "SELECT First Name FROM Data Table WHERE StoreID=0021 AND Quantity Purchased=(SELECT max(Quantity Purchased) FROM Data Table as f WHERE f.StoreID=Data Table.StoreID)") to apply the particular function (e.g., the max function) to the entries selected as corresponding to the particular entry value (e.g., "0021") of the third particular column (e.g., the "StoreID" column).

The query analyzer 108 generates the second query 750 (e.g., "SELECT First Name FROM Data Table WHERE StoreID=0021 AND Quantity Purchased=(SELECT max (Quantity Purchased) FROM Data Table as f WHERE f.StoreID=Data Table.StoreID)") corresponding to the natural language query 150 (e.g., "Who made the most purchases from store ABC?"). The query analyzer 108 generates the response 152 (e.g., "Joe") to the second query 750 by executing the second query 750 against a database instance that includes the data table 140. The query analyzer outputs the response 152 (e.g., "Joe") as a response to the natural language query 150 (e.g., "Who made the most purchases from store ABC?").

It should be understood that the examples provided herein are illustrative and non-limiting. The query analyzer 108 is configured to analyze various types of natural language queries.

FIG. 8 illustrates an example 800 of receiving disambiguation data corresponding to a query term. For example, the query analyzer 108 provides a query term 802 of the natural language query 150 as the input 157 to the data source 123.

The query analyzer 108 receives the disambiguation data 148 from the data source 123 and generates the response 152 at least partially based on the disambiguation data 148, as described with reference to FIG. 7.

FIG. 9 illustrates an example 900 of using the data model 146 to identify one or more entry values corresponding to a query term. For example, the query analyzer 108 provides a query term 902 of the natural language query 150 as the input 147 to the data model 146.

The query analyzer 108 receives the output 149 from the data model 146. The output 149 indicates a term wordvec 912 corresponding to the query term 902. The query analyzer 108 accesses entry wordvecs 920 corresponding to entries 910 of the data table 140. The query analyzer 108 may generate the entry wordvecs 920 prior to, or subsequent to, receiving the natural language query 150. For example, the query analyzer 108 provides an entry 904 (e.g., an entry value of the entry 904) of the data table 140 of FIG. 1 as the input 147 and receives the output 149 from the data model 146. The output 149 includes an entry wordvec 914 corresponding to the entry 904. The query analyzer 108 adds the entry wordvec 914 to the entry wordvecs 920. The query analyzer 108 provides an entry 906 (e.g., an entry value of the entry 906) of the data table 140 of FIG. 1 as the input 147 and receives the output 149 from the data model 146. The output 149 includes an entry wordvec 916 corresponding to the entry 906. The query analyzer 108 adds the entry wordvec 916 to the entry wordvecs 920.

The query analyzer 108 generates similarity metrics based on a comparison of the term wordvec 912 with the entry wordvecs 920. For example, the query analyzer 108 generates a first similarity metric based on a comparison of the term wordvec 912 and the entry wordvec 914 and a second similarity metric based on a comparison of the term wordvec 912 and the entry wordvec 916.

The query analyzer 108 determines whether any of the entries 910 appear to be related to the query term 902. For example, the query analyzer 108 determines that the entry 904 appears to be related to the query term 902 in response to determining that the first similarity metric satisfies a comparison threshold. Alternatively the query analyzer 108 determines that the entry 904 appears to unrelated (or distantly related) to the query term 902 in response to determining that the first similarity metric fails to satisfy the comparison threshold. Similarly, the query analyzer 108 determines whether the entry 904 appears to be related to the entry 906 based on the second similarity metric and the comparison threshold. The query analyzer 108 may generate the response 152 at least partially based on one or more entries that appear related to the query term 902, as described with reference to FIG. 7.

FIG. 10 illustrates an example 1000 of updating annotation data based on user input. For example, the query analyzer 108 receives the natural language query 150 (e.g., "How much was the sum of the total price in US dollars?").

As described with reference to FIG. 7, the query analyzer 108 determines that a subject term (e.g., "How much") of the natural language query 150 (e.g., "How much was the total price in US dollars?") matches a first column (e.g., the "Price per Unit" column) based on column annotation data (e.g., "How", "Unit Price", and "Currency") corresponding to the first column. The annotation data 568 of FIG. 5 indicates the column annotation data corresponding to the first column. Similarly, the query analyzer 108 determines that the subject term (e.g., "How much") of the natural language query 150 (e.g., "How much was the total price in US dollars?") matches a second column (e.g., the "Total Price" column) based on column annotation data (e.g., "How", "Total Price", and "Currency") corresponding to the second column. The annotation data 570 of FIG. 5 may indicate the column annotation data corresponding to the second column.

The query analyzer 108 determines, based on sentence structure analysis, that predicate terms (e.g., "was the sum of the total price in US dollars?") corresponds to a predicate of the natural language query 150. The query analyzer 108 determines that a function term (e.g., "sum") of the natural language query 150 corresponds to a particular function (e.g., a sum function), as described with reference to FIG. 7.

The query analyzer 108 determines that a first predicate term (e.g., "total price") matches the second column (e.g., the "Total Price" column) based on column annotation data (e.g., "How", "Total Price", and "Currency"). The query analyzer 108, in response to determining that the first predicate term (e.g., "total price") matches the second column (e.g., the "Total Price" column), selects the second column and disregards the first column (e.g., the "Price per Unit" column).

The query analyzer 108 determines based on sentence structure analysis that a modifier term (e.g., "US dollars") appears to modify the first predicate term (e.g., "total price"). In a particular aspect, the query analyzer 108, in response to determining that the modifier term (e.g., "US dollars") corresponds to an instance of the ontology class (e.g., "Currency") associated with the second column (e.g., the "Total Price" column), determines that a prompt 1054 requesting user input is to be generated. For example, the query analyzer 108 determines that the ontology 130 indicates that the modifier term (e.g., "US dollars") is an instance of an ontology class (e.g., "Currency") indicated by the column annotation data corresponding to the second column. As another example, the query analyzer 108 provides the modifier term (e.g., "US dollars"), the column annotation data (e.g., "Currency"), or both, as the input 157 to the data source 123. In this example, the query analyzer 108 receives the disambiguation data 148 indicating that the modifier term (e.g., "US dollars") corresponds to an instance of the ontology class (e.g., "Currency") indicated by the column annotation data.

The query analyzer 108, in response to determining that the modifier term (e.g., "US dollars") corresponds to an instance (e.g., "US dollars") of the ontology class (e.g., "Currency") associated with the second column (e.g., the "Total Price" column), generates the prompt 1054 (e.g., "Is the total price in US dollars?") to request user input indicating whether the second column corresponds to the modifier term (e.g., "US dollars").

In a particular aspect, the query analyzer 108 determines that a prompt 1054 requesting user input is to be generated in response to determining that the modifier term (e.g., "US dollars") appears to be related to, but not synonymous with, an annotation term (e.g., "Currency") indicated by the column annotation data. For example, the query analyzer 108 generates a similarity metric based on a comparison of a modifier wordvec corresponding to the modifier term (e.g., "US dollars") and an annotation wordvec corresponding to the annotation term (e.g., "Currency"). The query analyzer 108, in response to determining that the similarity metric satisfies a first comparison threshold, determines that the modifier term (e.g., "US dollars") appears to be related to the annotation term (e.g., "Currency"). The query analyzer 108, in response to determining that the similarity metric fails to satisfy a second comparison threshold, determines that the modifier term (e.g., "US dollars") does not appear to be synonymous with the annotation term (e.g., "Currency"). As another example, the query analyzer 108 provides the modifier term (e.g., "US dollars"), the annotation term (e.g., "Currency"), or both, as the input 157 to the data source 123. The query analyzer 108 receives the disambiguation data 148 indicating that the modifier term (e.g., "US dollars") is related to, but not synonymous with the modifier term (e.g., "US dollars").

The query analyzer 108, in response to determining that the modifier term (e.g., "US dollars") appears to be related but not synonymous with the annotation term (e.g., "Currency"), generates the prompt 1054 (e.g., "Is the total price in US dollars?") to request user input indicating whether the second column (e.g., the "Total Price" column) corresponds to the modifier term (e.g., "US dollars").

The query analyzer 108 provides the prompt 1054 (e.g., "Is the total price in US dollars?") to a display (or another device). The query analyzer 108, in response to receiving a user input 1056 (e.g., "Yes") indicating that the modifier term (e.g., "US dollars") corresponds to the second column (e.g., the "Total Price") column, updates the annotation data 570 to add the modifier term (e.g., "US dollar") to the column annotation data, entry annotation data associated with each entry of the second column, or a combination thereof.

In a particular aspect, the query analyzer 108, in response to receiving the user input 1056 (e.g., "Yes") indicating that the modifier term (e.g., "US dollars") corresponds to the second column (e.g., the "Total Price") column, determines that the modifier term corresponds to the annotation term (e.g., "Currency") associated with the second column (e.g., the "Total Price") column. The query analyzer 108, in response to determining that the annotation term (e.g., "Currency") is also associated with another column (e.g., the "Price per Unit" column), updates the annotation data 568 (corresponding to the first column) to add the modifier term (e.g., "US dollar") to the column annotation data, entry annotation data associated with each entry of the first column, or a combination thereof.

The query analyzer 108, in response to determining that the first predicate term (e.g., "total price") matches the second column (e.g., the "Total Price" column) and that the modifier term (e.g., "US dollars") corresponds to the second column, generates the second query 750 (e.g., "SELECT sum (Total Price) FROM Data Table") to apply the particular function (e.g., the sum function) to entries of the second column.

The query analyzer 108 generates the second query 750 (e.g., "SELECT sum (Total Price) FROM Data Table") corresponding to the natural language query 150 (e.g., "How much was the sum of the total price in US dollars?"). The query analyzer 108 generates the response 152 (e.g., "90.9") to the second query 750 by executing the second query 750 against a database instance that includes the data table 140. The query analyzer 108 outputs the response 152 (e.g., "90.9") as a response to the natural language query 150.

The query analyzer 108 receives a natural language query 1050 (e.g., "How much was the sum of total price in Canadian dollars?"). The query analyzer 108 determines that a modifier term (e.g., "Canadian dollars") of the natural language query 1050 corresponds to a first instance of an ontology class (e.g., "Currency") and that an annotation term (e.g., "US dollars") associated with each entry of the second column (e.g., the "Total Price" column) corresponds to a second instance of the ontology class. For example, the ontology 130 indicates that the modifier term (e.g., "Canadian dollars") corresponds to the first instance and that the annotation term (e.g., "US dollars") corresponds to the second instance. As another example, the query analyzer 109 provides the modifier term (e.g., "Canadian dollars"), the annotation term (e.g., "US dollars"), or both, to the data source 123, and receives the disambiguation data 148 from the data source 123. The disambiguation data 148 indicates that the modifier term (e.g., "Canadian dollars") corresponds to the first instance of the ontology class (e.g., "Currency") and that the annotation term (e.g., "US dollars") corresponds to the second instance of the ontology class (e.g., "Currency"). In a particular aspect, the query analyzer 108 determines, based on the data model 146, the disambiguation data 148, or both, that the modifier term (e.g., "Canadian dollars") is related to, but not synonymous with, the annotation term (e.g., "US dollars").

In a particular aspect, the query analyzer 108 determines a conversion factor in response to determining that the second column (e.g., the "Total Price" column) corresponds to a numeric data type (e.g., the "Currency" data type) and that the modifier term (e.g., "Canadian dollars") corresponds to the first instance of the ontology class (e.g., "Currency") and that the annotation term (e.g., "US dollars") corresponds to the second instance of the ontology class (e.g., "Currency"). In an alternate aspect, the query analyzer 108 determines the conversion factor in response to determining that the second column corresponds to a numeric data type (e.g., the "Currency" data type) and that the modifier term (e.g., "Canadian dollars") is related to, but not synonymous with, the annotation term (e.g., "US dollars").

The query analyzer 108 analyses the disambiguation data 148 to determine the conversion factor for converting the annotation term (e.g., "US dollars") to the modifier term (e.g., "Canadian dollars"). For example, the query analyzer 108 provides the modifier term (e.g., "Canadian dollars"), the annotation term (e.g., "US dollars"), or both, to the data source 123, and receives the disambiguation data 148 from the data source 123. The disambiguation data 148 indicates the conversion factor (e.g., 1.25) for converting from the annotation term (e.g., "US dollars") to the modifier term (e.g., "Canadian dollars"). The query analyzer 108 generates the second query 750 (e.g., "SELECT 1.25*SUM (Total Price) FROM Data Table") to apply the conversion factor to the result of applying the particular function (e.g., the sum function) to entries of the second column (e.g., the "Total Price" column).

The query analyzer 108 generates the second query 750 (e.g., "SELECT 1.25*SUM (Total Price) FROM Data Table") corresponding to the natural language query 1050 (e.g., "How much was the sum of the total price in Canadian dollars?"). The query analyzer 108 generates a response 1052 (e.g., "113.63") to the second query 750 by executing the second query 750 against a database instance that includes the data table 140. The query analyzer 108 outputs the response 1052 (e.g., "113.63") as a response to the natural language query 1050.

The query analyzer 108 may thus update annotation data based on user input and generate responses to natural language queries based on the updated annotation data. The example 1000 also illustrates that the query analyzer 108 may use a conversion factor to generate a response when a column is associated with a first numeric type and a natural language query indicates a second numeric type. Determining the conversion factor based on the disambiguation data 148 based on a term of the natural language query reduces memory resource utilization. For example, the query analyzer 108 generates the conversion factor on-the-fly based on terms of a received natural language query (e.g., an actual query) as compared to preemptively generating and storing conversion factors corresponding to terms that could potentially be received in a natural language query (e.g., potential queries).

Figure 11:
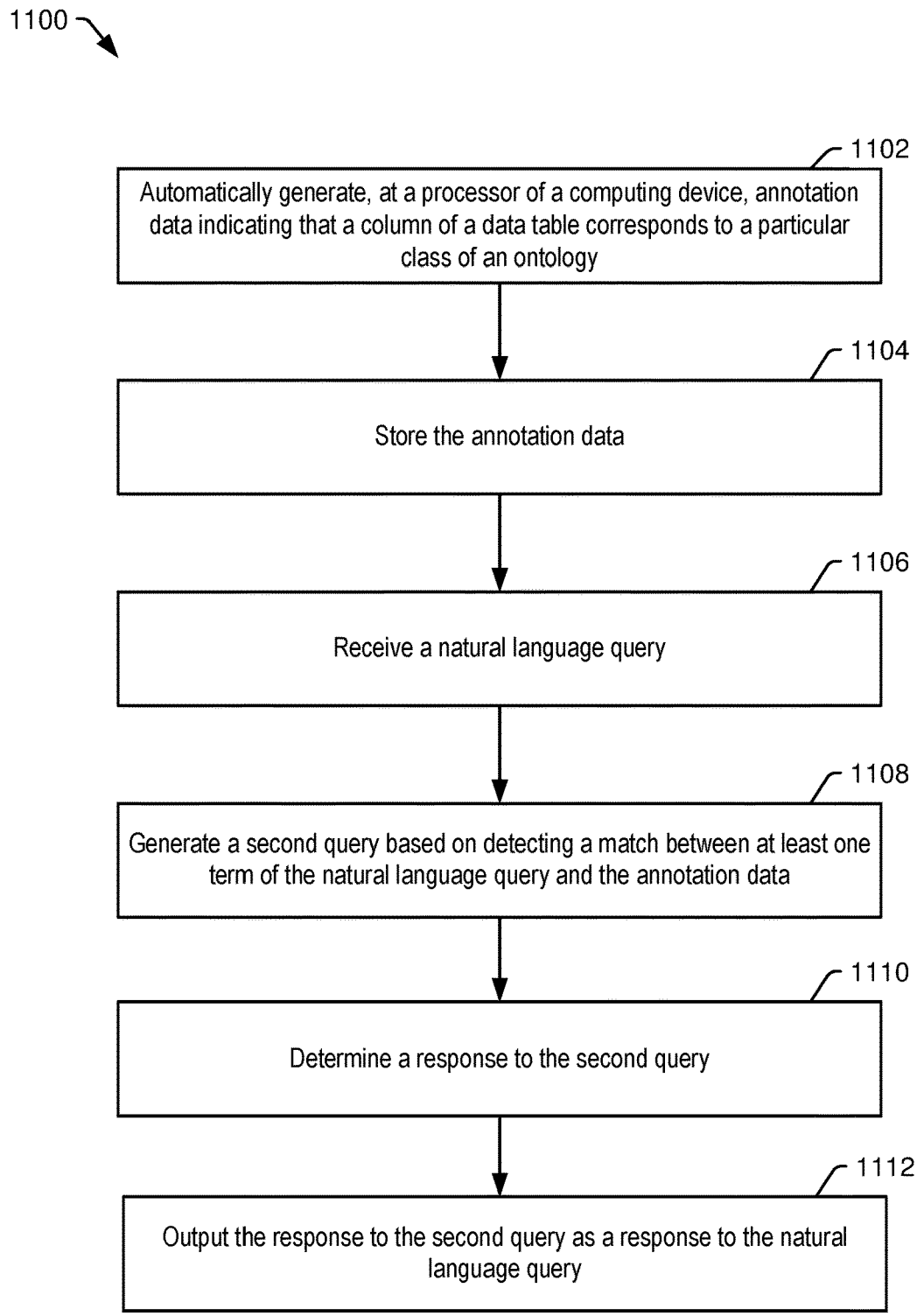
FIG. 11 is a flowchart illustrating a particular example of a method of natural language querying based on annotation data.

FIG. 11 is a flowchart illustrating a particular example of a method 1100 of natural language querying. The method 1100 may be performed by the annotation data generator 106, the query analyzer 108, the computing device 102 of FIG. 1, or a combination thereof. For example, a processor (e.g., the annotation data generator 106, the query analyzer 108, or both) executing instructions from the memory 104 of FIG. 1 may perform the method 1100.

The method 1100 includes, at 1102, automatically generating, at a processor of a computing device, annotation data indicating that a column of a data table corresponds to a particular class of an ontology. For example, the annotation data generator 106 generates the annotation data 160 indicating that the first column 142 of the data table 140 corresponds to a particular class (e.g., the "Person" class) of the ontology 130, as described with reference to FIG. 1.

The method 1100 also includes, at 1104, storing the annotation data. For example, the annotation data generator 106 of FIG. 1 stores the annotation data 160 at the data source 122.

The method 1100 further includes, at 1106, receiving a natural language query. For example, the query analyzer 108 of FIG. 1 receives the natural language query 150, as described with reference to FIG. 1.

The method 1100 also includes, at 1108, generating a second query based on detecting a match between at least one term of the natural language query and the annotation data. For example, the query analyzer 108 of FIG. 1 generates the second query 750 based on detecting a match between at least one term of the natural language query and the annotation data, as described with reference to FIG. 7.

The method 1100 further includes, at 1110, determining a response to the second query. For example, the query analyzer 108 of FIG. 1 determines the response 152 to the second query 750, as described with reference to FIG. 7.

The method 1100 also includes, at 1112, outputting the response to the second query as a response to the natural language query. For example, the query analyzer 108 of FIG. 1 outputs the response 152 to the second query 750 as a response to the natural language query 150.

Thus, the method 1100 enables automatically generating annotation data indicating that a column corresponds to a particular class of an ontology and generating a response to a natural language query based on detecting a match between the annotation data and at least one term of the natural language query.

Automatic generation of the annotation data may reduce memory utilization. For example, the annotation data generator 106 stores an identifier associated with a particular class (e.g., the "Person" class) of the ontology 130 in the column annotation data 162 corresponding to the first column 142. Storing the identifier of the particular class may use less memory space than storing user provided text (e.g., "Person") that represents the particular class. The ontology 130 may indicate that the particular class (e.g., the "Person") is a sub-class of a second class (e.g., an "Agent" class) that is a sub-class of a third class (e.g., a "Thing" class). Storing the single identifier associated with the particular class (e.g., the "Person" class) in the column annotation data 162 may implicitly indicate that the column also corresponds to one or more parent classes (e.g., the "Agent" class and the "Person" class) of the particular class. Storing the single identifier of the particular class may use less memory space than storing representations of multiple classes, such as a first representation of the particular class, a second representation of the second class, and a third representation of the third class. Automatic generation of the annotation data may be faster and less error-prone than manual input of annotation data.

Figure 12:
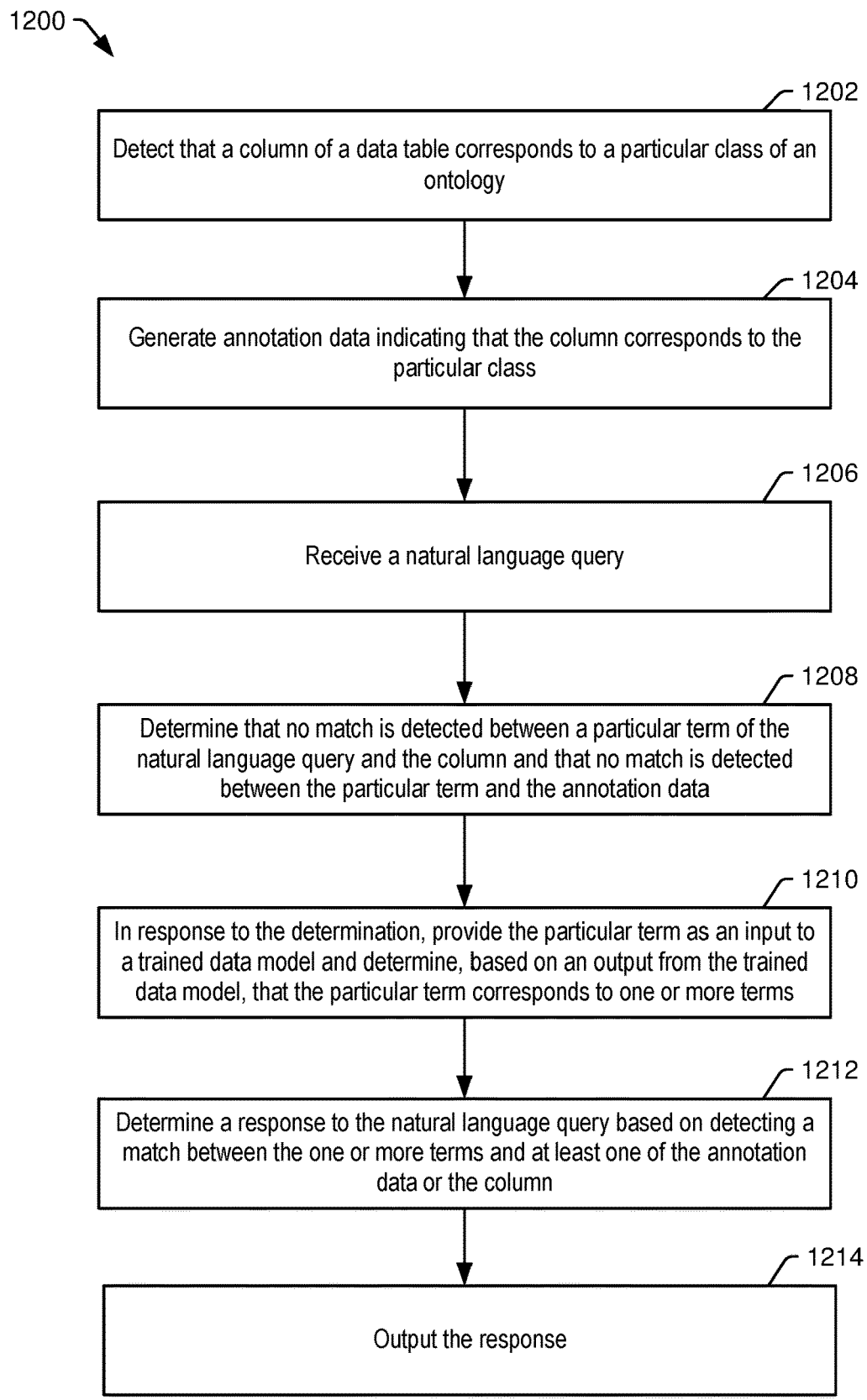
FIG. 12 is a flowchart illustrating a particular example of a method of natural language querying based on a data model.

FIG. 12 is a flowchart illustrating a particular example of a method 1200 of natural language querying. The method 1200 may be performed by the annotation data generator 106, the query analyzer 108, the computing device 102 of FIG. 1, or a combination thereof. For example, a processor (e.g., the annotation data generator 106, the query analyzer 108, or both) executing instructions from the memory 104 of FIG. 1 may perform the method 1200.

The method 1200 includes, at 1202, detecting that a column of a data table corresponds to a particular class of an ontology. For example, the annotation data generator 106 of FIG. 1 detects that a column (e.g., the "Product" column) of the data table 140 corresponds to a particular class (e.g., a "Fruit" class) of the ontology 130, as described with reference to FIG. 6.

The method 1200 also includes, at 1204, generating annotation data indicating that the column corresponds to the particular class. For example, the annotation data generator 106 generates the annotation data 674 indicating that the particular column (e.g., the "Product" column) corresponds to the particular class (e.g., the "Fruit" class), as described with reference to FIG. 6.

The method 1200 further includes, at 1206, receiving a natural language query. For example, the query analyzer 108 of FIG. 1 receives the natural language query 150.

The method 1200 also includes, at 1208, determining that no match is detected between a particular term of the natural language query and the column and that no match is detected between the particular term and the annotation data. For example, the query analyzer 108 of FIG. 1 determines that no match is detected between a particular term (e.g., "citrus") of the natural language query 150 and the column (e.g., the "Product" column) and that no match is detected between the particular term and the annotation data (e.g., the annotation data 674), as described with reference to FIG. 7.

The method 1200 further includes, in response to the determination, at 1208, providing the particular term as an input to a trained data model and determining, based on an output from the trained data model, that the particular term corresponds to one or more terms, at 1210. For example, the query analyzer 108 of FIG. 1 provides the particular term (e.g., "citrus") as the input 147 to the data model 146 (e.g., a trained data model). The query analyzer 108 determines, based on the output 149 from the data model 146, that the particular term (e.g., "citrus") corresponds to one or more terms (e.g., "Orange", "Fruit", "Product", "Grapefruit", and "Flavor"), as described with reference to FIG. 7.

The method 1200 also includes, at 1212, determining a response to the natural language query based on detecting a match between the one or more terms and at least one of the annotation data or the column. For example, the query analyzer 108 of FIG. 1 determines the response 152 to the natural language query 150 based on detecting a match between the one or more terms (e.g., "Orange", "Fruit", "Product", "Grapefruit", and "Flavor") and at least one entry value (e.g., "Orange" and "Grapefruit") of a particular column (e.g., the "Product" column), as described with reference to FIG. 7.

The method 1200 further includes, at 1214, outputting the response. For example, the query analyzer 108 of FIG. 1 outputs the response 152.

The method 1200 thus enables generating the response 152 to the natural language query 150 when the natural language query 150 includes one or more query terms that do not match entry values of the data table 140, do not match column headers of the data table 140, and do not match the annotation data 160. For example, the query analyzer 108 identifies terms that are related to the query terms based on the data model 146 and generates the response 152 based on the related terms.

Figure 13:
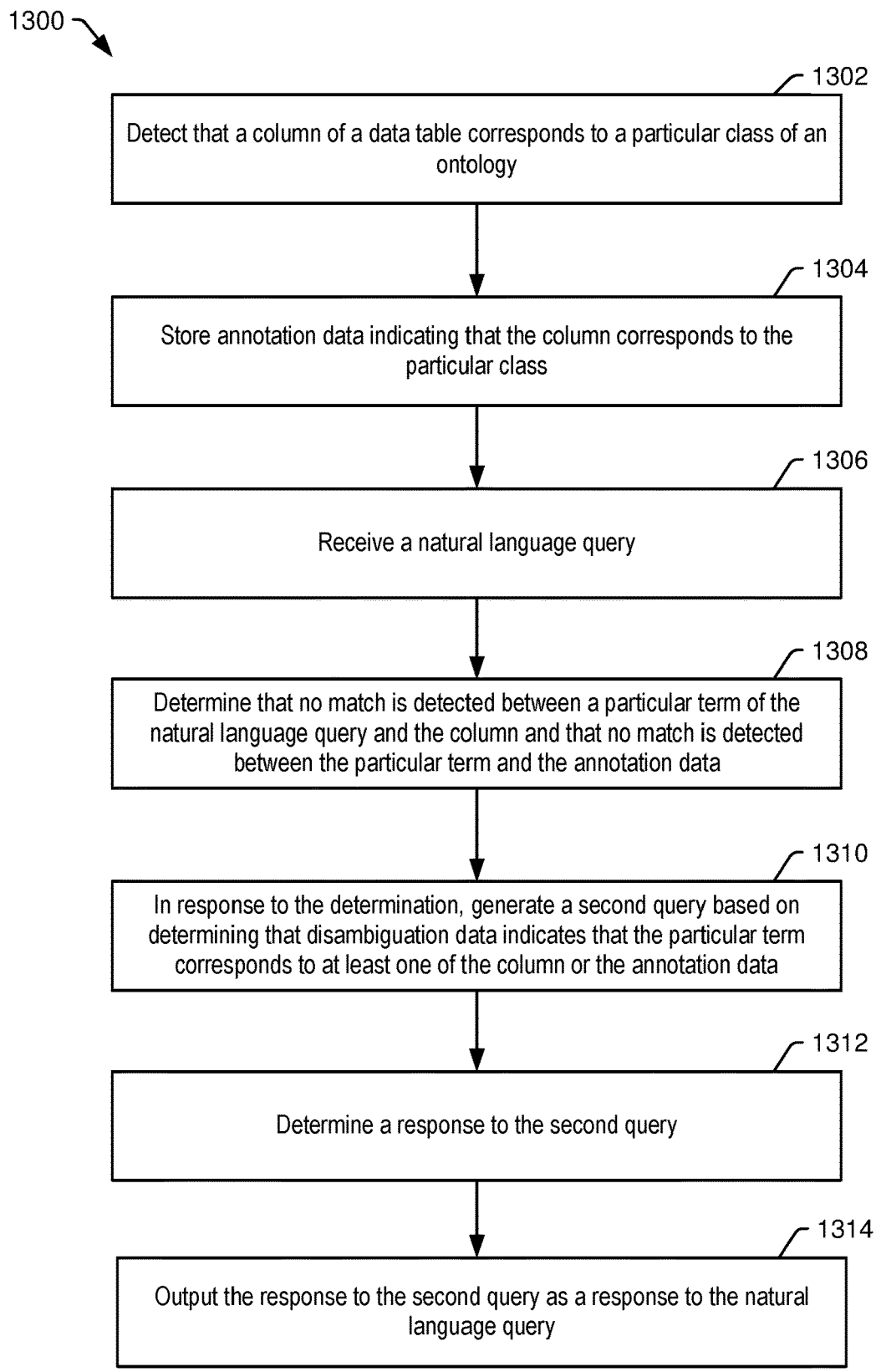
FIG. 13 is a flowchart illustrating a particular example of a method of natural language querying based on disambiguation data.

FIG. 13 is a flowchart illustrating a particular example of a method 1300 of natural language querying. The method 1300 may be performed by the annotation data generator 106, the query analyzer 108, the computing device 102 of FIG. 1, or a combination thereof. For example, a processor (e.g., the annotation data generator 106, the query analyzer 108, or both) executing instructions from the memory 104 of FIG. 1 may perform the method 1300.

The method 1300 includes, at 1302, detecting that a column of a data table corresponds to a particular class of an ontology. For example, the annotation data generator 106 of FIG. 1 detects that the first column 142 of the data table 140 corresponds to a particular class (e.g., the "Person" class) of the ontology 130, as described with reference to FIG. 1.

The method 1300 also includes, at 1304, storing annotation data indicating that the column corresponds to the particular class. For example, the annotation data generator 106 of FIG. 1 stores the annotation data 160 at the data source 122 or another data source. The annotation data 160 indicates that the first column 142 corresponds to the particular class (e.g., the "Person" class).

The method 1300 further includes, at 1306, receiving a natural language query. For example, the query analyzer 108 of FIG. 1 receives the natural language query 150.

The method 1300 also includes, at 1308, determining that no match is detected between a particular term of the natural language query and the column and that no match is detected between the particular term and the annotation data. For example, the query analyzer 108 of FIG. 1 determines that no match is detected between a particular term (e.g., "citrus") of the natural language query 150 and the column (e.g., the "Product" column) and that no match is detected between the particular term and the annotation data (e.g., the annotation data 674), as described with reference to FIG. 7.

The method 1300 further includes, in response to the determination, at 1308, generating a second query based on determining that disambiguation data indicates that the particular term corresponds to at least one of the column or the annotation data, at 1310. For example, the query analyzer 108 of FIG. 1 generates the second query 750 based on determining that the disambiguation data 148 indicates that the particular term (e.g., "citrus") corresponds to at least one of the column (e.g., the "Product" column) or the annotation data 674, as further described with reference to FIG. 7.

The method 1300 further includes, at 1312, determining a response to the second query. For example, the query analyzer 108 of FIG. 1 determines the response 152 to the second query 750.

The method 1300 also includes, at 1314, outputting the response to the second query as a response to the natural language query. For example, the query analyzer 108 of FIG. 1 outputs the response 152 as a response to the natural language query 150.

The method 1300 thus enables generating the response 152 to the natural language query 150 when the natural language query 150 includes one or more query terms that do not match entry values of the data table 140, do not match column headers of the data table 140, and do not match the annotation data 160. For example, the query analyzer 108 identifies terms that are related to the query terms based on the disambiguation data 148 and generates the response 152 based on the related terms.

The systems and methods illustrated herein may be described in terms of functional block components, screen shots, optional selections and various processing steps. It should be appreciated that such functional blocks may be realized by any number of hardware and/or software components configured to perform the specified functions. For example, a system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like.

The systems and methods of the present disclosure may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based (e.g., cloud computing) embodiment, an entirely hardware embodiment, or an embodiment combining aspects of the internet, software and hardware. Furthermore, the system may take the form of a computer program product on a computer-readable storage medium or device having computer-readable program code (e.g., instructions) embodied or stored in the storage medium or device. Any suitable computer-readable storage medium or device may be utilized, including hard disks, CD-ROM, optical storage devices, magnetic storage devices, and/or other storage media. A computer-readable storage medium or device is not a signal.

Systems and methods may be described herein with reference to screen shots, block diagrams and flowchart illustrations of methods, apparatuses (e.g., systems), and computer media according to various aspects. It will be understood that each functional block of a block diagrams and flowchart illustration, and combinations of functional blocks in block diagrams and flowchart illustrations, respectively, can be implemented by computer program instructions.

Computer program instructions may be loaded onto a computer or other programmable data processing apparatus to produce a machine, such that the instructions that execute on the computer or other programmable data processing apparatus create means for implementing the functions specified in the flowchart block or blocks. These computer program instructions may also be stored in a computer-readable memory or device that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Methods disclose herein may be embodied as computer program instructions on a tangible computer-readable medium, such as a magnetic or optical memory or a magnetic or optical disk/disc. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Changes and modifications may be made to the disclosed embodiments without departing from the scope of the present disclosure. These and other changes or modifications are intended to be included within the scope of the present disclosure, as expressed in the following claims.

What is claimed is:

1. A method of querying a data table, the method comprising:
   receiving a natural language query;
   providing a vector representing the natural language query as input to a trained data model;
   determining, based on output of the trained data model, similarity metrics indicative of proximity of the vector to points in a feature space, the similarity metrics comprising a first similarity metric based on a comparison of the vector with a first ontology word vector and a second similarity metric based on a comparison of the vector with a second ontology word vector;
   selecting a subset of the data table based on the similarity metrics;
   searching the subset of the data table to determine a response to the natural language query; and
   outputting the response to the natural language query.

2. The method of claim 1, further comprising performing sentence structure analysis to identify sentence components of terms in the natural language query to generate the vector.

3. The method of claim 2, wherein the sentence components include at least one of a predicate term, a modifier term, a prepositional phrase term, a function term, or a subject term.

4. The method of claim 1, wherein the vector represents one or more words of the natural language query and the points in the feature space correspond to vectors representing one or more words associated with the data table.

5. The method of claim 4, wherein the one or more words associated with the data table include at least a portion of one or more column headers of the data table.

6. The method of claim 4, wherein the one or more words associated with the data table include annotation data associated with the data table.

7. The method of claim 4, wherein the one or more words associated with the data table include metadata associated with the data table.

8. The method of claim 4, wherein the one or more words associated with the data table include data entries of the data table.

9. The method of claim 1, wherein the subset of the data table corresponds to points in the feature space that are within a comparison threshold distance from the vector.

10. The method of claim 1, wherein the subset of the data table includes one or more columns of the data table.

11. The method of claim 10, wherein searching the subset of the data table to determine the response to the natural language query includes selecting a data entry that answers the natural language query from among data entries of the one or more columns.

12. A computing device comprising:
    a memory storing a data table;
    an input interface configured to receive a natural language query;
    a processor configured to:
      provide a vector representing the natural language query as input to a trained data model;
      determine, based on output of the trained data model, similarity metrics indicative of proximity of the vector to points in a feature space, the similarity metrics comprising a first similarity metric based on a comparison of the vector with a first ontology word vector and a second similarity metric based on a comparison of the vector with a second ontology word vector;
      select a subset of the data table based on the similarity metrics; and
      search the subset of the data table to determine a response to the natural language query; and
    an output interface configured to output the response to the natural language query.

13. The computing device of claim 12, wherein the processor is further configured to perform sentence structure analysis to identify sentence components of terms in the natural language query to generate the vector.

14. The computing device of claim 13, wherein the sentence components include at least one of a predicate term, a modifier term, a prepositional phrase term, a function term, or a subject term.

15. The computing device of claim 12, wherein the vector represents one or more words of the natural language query and the points in the feature space correspond to vectors representing one or more words associated with the data table.

16. The computing device of claim 12, wherein the subset of the data table corresponds to points in the feature space that are within a comparison threshold distance from the vector.

17. The computing device of claim 12, wherein searching the subset of the data table to determine the response to the natural language query includes selecting a data entry that answers the natural language query from among data entries of one or more columns of the subset of the data table.

18. A computer-readable storage device storing instructions that, when executed, causes a processor to perform operations comprising:
    receiving a natural language query;
    providing a vector representing the natural language query as input to a trained data model;
    determine, based on output of the trained data model, similarity metrics indicative of proximity of the vector to points in a feature space, the similarity metrics comprising a first similarity metric based on a comparison of the vector with a first ontology word vector and a second similarity metric based on a comparison of the vector with a second ontology word vector;

selecting a subset of a data table based on the similarity metrics;

searching the subset of the data table to determine a response to the natural language query; and outputting the response to the natural language query.

19. The computer-readable storage device of claim 18, wherein the operations further comprise performing sentence structure analysis to identify sentence components of terms in the natural language query to generate the vector.

20. The computer-readable storage device of claim 19, wherein the sentence components include at least one of a predicate term, a modifier term, a prepositional phrase term, a function term, or a subject term.

21. The computer-readable storage device of claim 18, wherein the vector represents one or more words of the natural language query and the points in the feature space correspond to vectors representing one or more words associated with the data table.

22. The computer-readable storage device of claim 18, wherein the subset of the data table corresponds to points in the feature space that are within a comparison threshold distance from the vector.

23. The computer-readable storage device of claim 18, wherein searching the subset of the data table to determine the response to the natural language query includes selecting a data entry that answers the natural language query from among data entries of one or more columns of the subset of the data table.

* * * * *